US007860206B2

(12) United States Patent
Fushimi et al.

(10) Patent No.: US 7,860,206 B2
(45) Date of Patent: Dec. 28, 2010

(54) REACTOR POWER CONTROL APPARATUS OF A NATURAL CIRCULATION BOILING WATER REACTOR AND A FEED WATER CONTROL APPARATUS AND NUCLEAR POWER GENERATION PLANT

(75) Inventors: Atsushi Fushimi, Hitachi (JP); Setsuo Arita, Hitachiota (JP); Kazuhiko Ishiii, Takahagi (JP); Yoshihiko Ishii, Hitachinaka (JP); Shin Hasegawa, Mito (JP); Atsutoshi Mizuide, Hitachi (JP)

(73) Assignee: Hitachi-GE Nuclear Energy, Ltd., Ibaraki-ken (JP)

( * ) Notice: Subject to any disclaimer, the term of this patent is extended or adjusted under 35 U.S.C. 154(b) by 95 days.

(21) Appl. No.: 11/657,459

(22) Filed: Jan. 25, 2007

(65) Prior Publication Data
US 2007/0201599 A1    Aug. 30, 2007

(30) Foreign Application Priority Data
Feb. 27, 2006   (JP)   ............................. 2006-049478
Feb. 27, 2006   (JP)   ............................. 2006-050914

(51) Int. Cl.
*G21C 7/36* (2006.01)
(52) U.S. Cl. ........................ 376/216; 376/210; 376/215
(58) Field of Classification Search ................. 376/216, 376/210, 211, 215, 372, 407
See application file for complete search history.

(56) References Cited

U.S. PATENT DOCUMENTS

| 4,486,381 | A | * | 12/1984 | Koji et al. | .................. 376/210 |
|---|---|---|---|---|---|
| 4,651,530 | A | * | 3/1987 | Omori | .......................... 60/667 |
| 4,877,574 | A |  | 10/1989 | Suzuki et al. | |
| 4,879,087 | A | * | 11/1989 | Akiyama et al. | ............ 376/216 |
| 4,947,485 | A | * | 8/1990 | Oosterkamp | ................. 376/210 |
| 5,100,609 | A | * | 3/1992 | Oosterkamp | ................. 376/210 |
| 5,268,939 | A | * | 12/1993 | Tang et al. | .................... 376/210 |
| 5,271,044 | A | * | 12/1993 | Hidaka et al. | ................ 376/214 |
| 5,406,597 | A | * | 4/1995 | Fennern et al. | ............. 376/232 |
| 5,993,411 | A | * | 11/1999 | Choi | ........................... 604/67 |

FOREIGN PATENT DOCUMENTS

| JP | 63-223591 | 9/1988 |
|---|---|---|
| JP | 06-027278 | 2/1994 |
| JP | 06-123797 | 5/1994 |
| JP | 2001-324590 | 11/2001 |

* cited by examiner

*Primary Examiner*—Rick Palabrica
(74) *Attorney, Agent, or Firm*—Antonelli, Terry, Stout & Kraus, LLP.

(57) ABSTRACT

In order to provide a reactor power control apparatus which can maintain a stable water level when reactivity control based on control rod operation and water level adjustment is performed, this invention comprises a turbine control which calculates the load set error signal from the error between the set target generator power value and the generator power that was fed back and outputs to the turbine control apparatus; control rod control in the natural circulation boiling water reactor which calculates the control rod operation signal and outputs it to the control rod drive control apparatus; water level control inside the natural circulation boiling water reactor which calculates the water level set signal and outputs it to the feed water control apparatus; and the switch determining device which selectively outputs one of the control rod control and water level control based on the generator power that was fed back, the reactor power and water level, as well as switching rules and determination values.

5 Claims, 20 Drawing Sheets

REACTOR POWER CONTROL APPARATUS OF A NATURAL CIRCULATION BOILING WATER REACTOR AND A FEED WATER CONTROL APPARATUS AND NUCLEAR POWER GENERATION PLANT

CLAIM OF PRIORITY

The present application claims priority from Japanese application serial no. 2006-049478, filed on Feb. 27, 2006 and Japanese application serial no. 2006-050914, filed on Feb. 27, 2006, the contents of which are hereby incorporated by reference into this application.

BACKGROUND OF THE INVENTION

The present invention relates to a reactor power control apparatus of a natural circulation boiling water reactor and a feed water control apparatus and nuclear power generation plant, and more particularly, the reactor power control apparatus and the feed water control apparatus for automatic control of the reactor power in a natural circulation boiling water reactor in which coolant is circulated by natural circulation, as well as to a nuclear power generation plant which is controlled by the feed water control apparatus Generally, boiling water reactors are largely divided into a forced circulation type and a natural circulation type based on the circulation method for the coolant (cooling water). A forced circulation boiling water reactor (referred to as forced circulation reactor hereinafter) includes a jet pump or an internal pump or the like. This pump forces cooling water into the core placed in a reactor pressure vessel.

Meanwhile, a natural circulation boiling water reactor (called natural circulation reactor hereinafter) does not include a pump which circulates the cooling water by force as in the case of the forced circulation reactor. In the natural circulation reactor, the cooling water is circulated by the natural circulation force which is based on the difference in density (head difference) of the cooling water outside of a core shroud which surrounds the core and the two-phase flow including the steam and the cooling water inside the core shroud.

In the prior art, reactivity adjustment of the boiling water reactor (BWR) is performed by inserting a control rod containing a neutron absorber into the core or withdrawing the control rod from the core, and adjusting recirculation flow rate (core flow rate) of the cooling water that is also a neutron moderator, through the core. During the power increase step in start-up time, the period between the beginning of start-up and generator synchronization, the reactivity adjustment is performed by the withdrawing operation of the control rod. After generator synchronization, the reactivity adjustment is performed by the withdrawing operation of the control rod and by increasing the recirculation flow rate. In start-up time, in addition to this reactivity adjustment, because the auxiliary devices must be started up and the valves must be opened and closed, the burden on the operator is great. As a result, in an advanced boiling water reactor (ABWR), control rod operation and recirculation flow rate operation are automated, and thus the burden on the operator is reduced.

For example, in Japanese Patent Laid-open No. Hei 6-2902217, the reactor power is controlled by control rod being operated by the control rod drive apparatus, and the cooling water recirculation flow rate being controlled by the internal pump. The control rod drive apparatus is controlled by a control rod drive control apparatus. The internal pump is controlled by a recirculation flow rate control apparatus through a inverter controller. In addition, the steam that is generated inside the reactor is supplied into the turbine through the main steam system. The steam exhausted from the turbine is condensed by a condenser. The cooling water generated by the condensation of the steam returned to the reactor via the feed water system and the feed water pump. Also, the amount of steam being supplied into the turbine through the main steam system is controlled by the turbine control apparatus.

Japanese Patent Application Laid-Open No. 6-123797 discloses a feed water control apparatus. The feed water control apparatus comprises: a selected water level setting apparatus in which first reactor water level set value is set lower than second reactor water level set value set by the water level setting apparatus; a switching element for switching second reactor water level set signal from the water level setting apparatus to first reactor water level set signal from the selected water level setting apparatus; and a water level setting changing apparatus for outputting a reactor water level setting change signal which switches the switching element by the inserting operation of the pre-selected control rod. When high reactor water level is not detected by the protection system and the selected control rod is operated, tripping of the turbine and scram of the reactor can be avoided by the control of the feed water control apparatus.

The natural circulation reactor is being developed in an effort to obtain a more economical reactor than the existing boiling water reactor and the advanced boiling water reactor. This natural circulation r reactor does not have devices which circulate the cooling water by pump force such as the internal pump or the jet pump being used in the existing boiling water reactor and the advanced boiling water reactor, nor the accompanying devices and controllers, and thus the structure is simple. Reactor power control of the forced circulation reactor was performed by recirculation flow rate control using the internal pump and the like. However, for that reason, other important control could not be performed in the natural circulation reactor.

In the natural circulation reactor, the reactor power control is mainly performed by the withdrawing operation of the control rod and the inserting operation of the control rod. The reactor power control being used the control rod in the natural circulation reactor occurs some difficulty with power control in the rated reactor power vicinity. It is first difficulty that fine adjustment of the reactor power by the reactor power control using the control rod is difficult. It is second difficulty that there is a large possibility that the maximum linear heat generating ratio or the minimum critical power ratio of the core will be outside the thermal limit range by local heating because comparatively large changes in power distribution occurs due to control rod operation.

Japanese Patent Laid-open No. Sho 63-223591 is described a reactor power control apparatus being devices for supplementing the reactor power control using control rod operation. The reactor power control apparatus adjusts the reactor water level in the coolant descending path so as to be lower than the reactor water level in the core shroud based on the reactor power demand signal. The coolant descending path is formed between the reactor vessel and the core shroud which encloses the core. Note that a coolant descending path returns the cooling water ejected from the core. The reactor power control apparatus controls the reactor power by adjusting the reactor water level so as to be the demanded reactor power and follows the reactor power corresponding load change due to the core flow rate.

In the natural circulation reactor, because the cooling water is circulated by natural circulation force, it is difficult to obtain the core flow rate that is the same as the forced circulation nuclear reactor in which the cooling water is circulated by force using a pump. As a result, in the natural circulation reactor, there is a tendency for the reactor power density to small compared with that of the forced circulation reactor.

As a result, a technique is known in which in order to increase the core flow rate and the reactor power density, a space called a chimney being filled with boiling water is formed above the reactor by extending the core shroud in the vertical direction (see Japanese Patent Laid-open No. 2003-130982 for example). The density difference between the inside and outside the core is increased by the chimney, and thus the core flow rate is increased.

A natural circulation reactor is desired which has excellent operation characteristics compared to the boiling water reactor in addition to economic advantage and maintenance performance. As a result, it is necessary to automate reactivity control in the time of start-up. However as described above, in the reactor power control using the control rod operation, a problem occurs that the reactor power control in the rated reactor power vicinity is difficult, because fine adjustment of the reactor power is difficult, and there is a large possibility that the maximum linear heat generating ratio or the minimum critical power ratio of the core will be outside the thermal limit range by distorted power distribution. For this reason, as described in Japanese Patent Laid-open No. Sho 63-223591, there is a method in which the reactor power control includes the control rod operation and the reactor water level control.

A method for the reactor power control is described in Japanese Patent Laid-open No. Sho 63-223591. In the method, the reactor water level is controlled independently of the control rod operation, either manually or automatically. If the reactor water level is manually or automatically controlled independent of the control rod operation, there is possibility that the measured reactor water level will reach the upper or lower limit of the reactor water level, because the reactor water level decreases by the insertion of the control rod for example, and the water level decreases by the reactor water level control for decreasing the reactor power too. In this manner when the reactor water level decreases based on water level variation caused by a reactor power change due to the control rod operation, and water level change controlled by feed water control, great variation of the reactor water level occurs. Thus, there is a problem in that the reactor water level monitoring will be reached the upper or lower limit of the reactor water level, automatic control stops or the scram of the reactor occurs. In order to prevent automatic control stopping or scramming, it becomes necessary to limit the water level setting range and ensure a margin. However, a problem arises in that the water level setting range that can be utilized in reactor power control becomes small.

In addition, in the case of the natural circulation reactor, because there is no re-circulation pump which circulates the cooling water by force, the core flow rate depends on the reactor water level in the downcomer portion (static head). In a natural circulation reactor, control of the reactor water level is important, because reactivity is applied in the reactor when the core flow rate increases, and because the reactor power increases.

However, in the feed water control apparatus of the conventional forced circulation reactor of Japanese Patent Laid-open No. 2003-130982, the control system is basically one in which the reactor water level is kept constant. Control in which the reactor power control corresponds with the reactor water level was never carried out in the prior art.

SUMMARY OF THE INVENTION

The first object of the present invention is to provide a reactor power control apparatus which can maintain a stable reactor water level when reactivity control using control rod operation and water level adjustment is performed.

The second object of the present invention is to provide a reactor power control apparatus which can control reactor power and ensure a large water level adjustment range when reactivity control using control rod operation and water level adjustment is performed.

The third object of the present invention is to allow favorable natural circulation reactor power control by actively utilizing reactor water level control.

In order to achieve the above objectives, the reactor power control apparatus of the present invention comprises: turbine control which calculates the load set error signal or the load set signal based on the error between the set target generator power value and the generator power value that was fed back, or based on the error between the target reactor power value and the reactor power that was fed back and outputs the obtained load set error signal or the load set signal to the turbine control apparatus; control rod control in the natural circulation boiling water reactor which calculates the control rod operation signal and outputs it to the control rod drive control apparatus; reactor water level control of the natural circulation boiling water reactor which calculates the water level set signal and outputs it to the feed water control apparatus; and the switch determining device which selectively outputs one of the control rod control and reactor water level control based on the generator power, the reactor power and reactor water level that was fed back, switching rules and determination values.

In particular, in the control rod following control, by outputting a fixed water level set value signal to the feed water control apparatus, large variations in the reactor water level at the time of control rod operation is prevented. In addition, in the case where the manual operation signal or the automatic operation signal is taken in from the feed water control apparatus, and the water level control apparatus has received the automatic reactor water level setting from the power control apparatus, automatic reactor power control becomes possible and as a result overlap of both reactor water level setting change due to manual control and reactor water level variation due to automatic reactor power control is prevented.

According to the present invention, in the natural circulation boiling water reactor, because reactor power control using control rod operation and reactor power control using adjustment of reactor water level are performed by the reactor power control apparatus, and thus overlapped control in the same direction of water level variation due to reactor power changes at the time of control rod operation and reactor water level setting changes due to feed water control is prevented. As a result, stable reactor power control is realized by adjustment of the reactor water level and a large reactor water level adjustment range is ensured. Thus, because automatic reactivity control including the control rod operation and the reactor water level adjustment becomes possible, fine adjustment of the reactor power in rated reactor power vicinity becomes possible and contact of the low thermal limit value is avoided.

In the present invention, in the case where feed water control for the natural circulation boiling water reactor is performed, main steam flow rate exhausted from the reactor, flow rate of the feed water being supplied into the reactor, and the error between the measured reactor water level signal and reactor water level set value are detected, flow rate control signal of the feed water supplied into the reactor is calculated based on the detected error and load demand error signal and rotation speed command for the feed water pump supplying the feed water into the reactor is generated based on the calculated feed water flow rate control signal.

According to the present invention, by controlling the flow rate of feed water being exhausted from the feed water pump which feeds water to the natural circulation boiling water reactor based on the error between each of the measured value and the reactor water level set value and the load demand error signal, the characteristic reactor power variation fluctuation in the natural circulation boiling water reactor can be suppressed by feed water flow rate control and as a result this contributes to stabilization of reactor power control.

DESCRIPTION OF THE PREFERRED EMBODIMENTS

Figure 1:
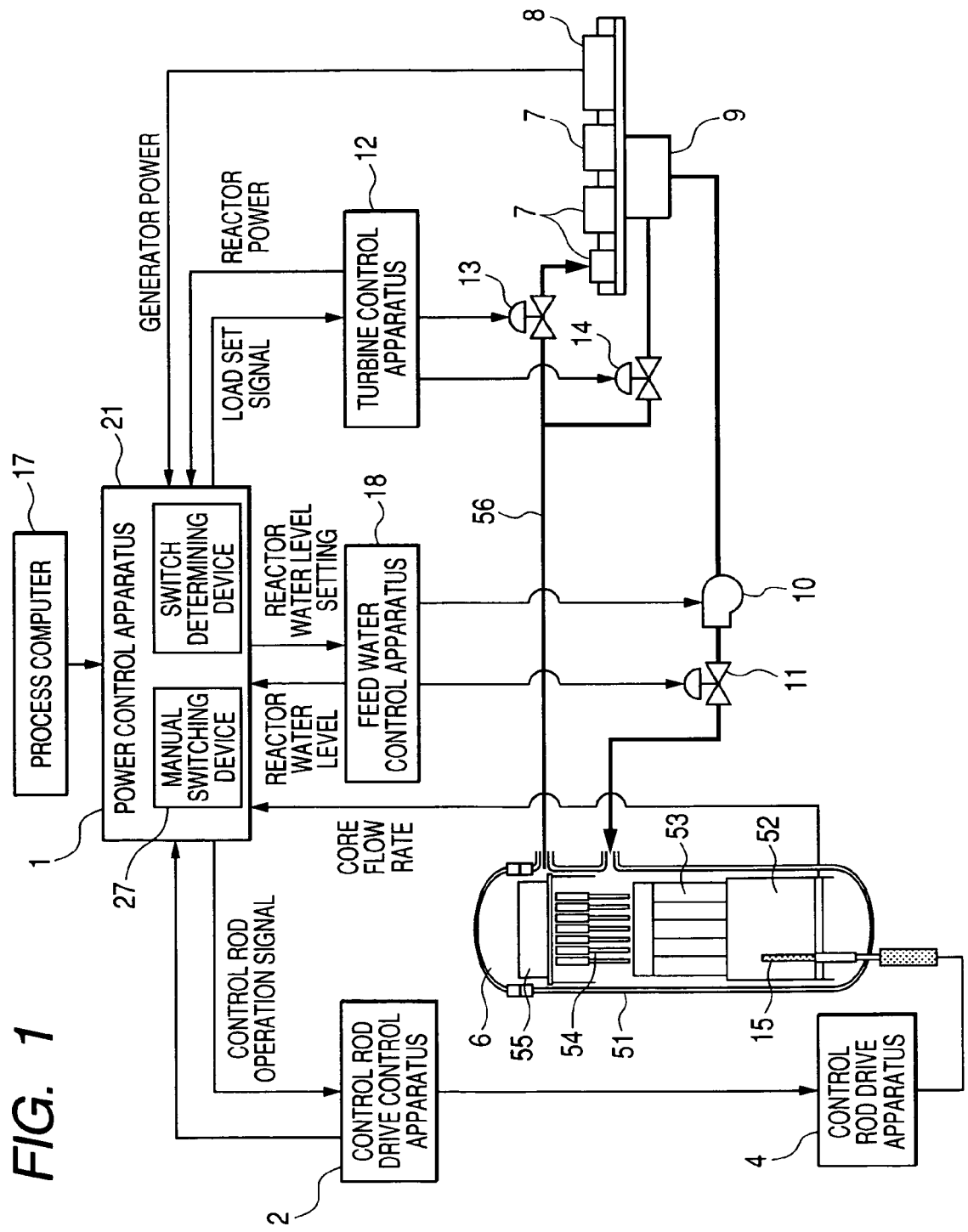
FIG. 1 is a structural diagram of a nuclear power generation equipment which is an embodiment of the present invention.
Figure 2:
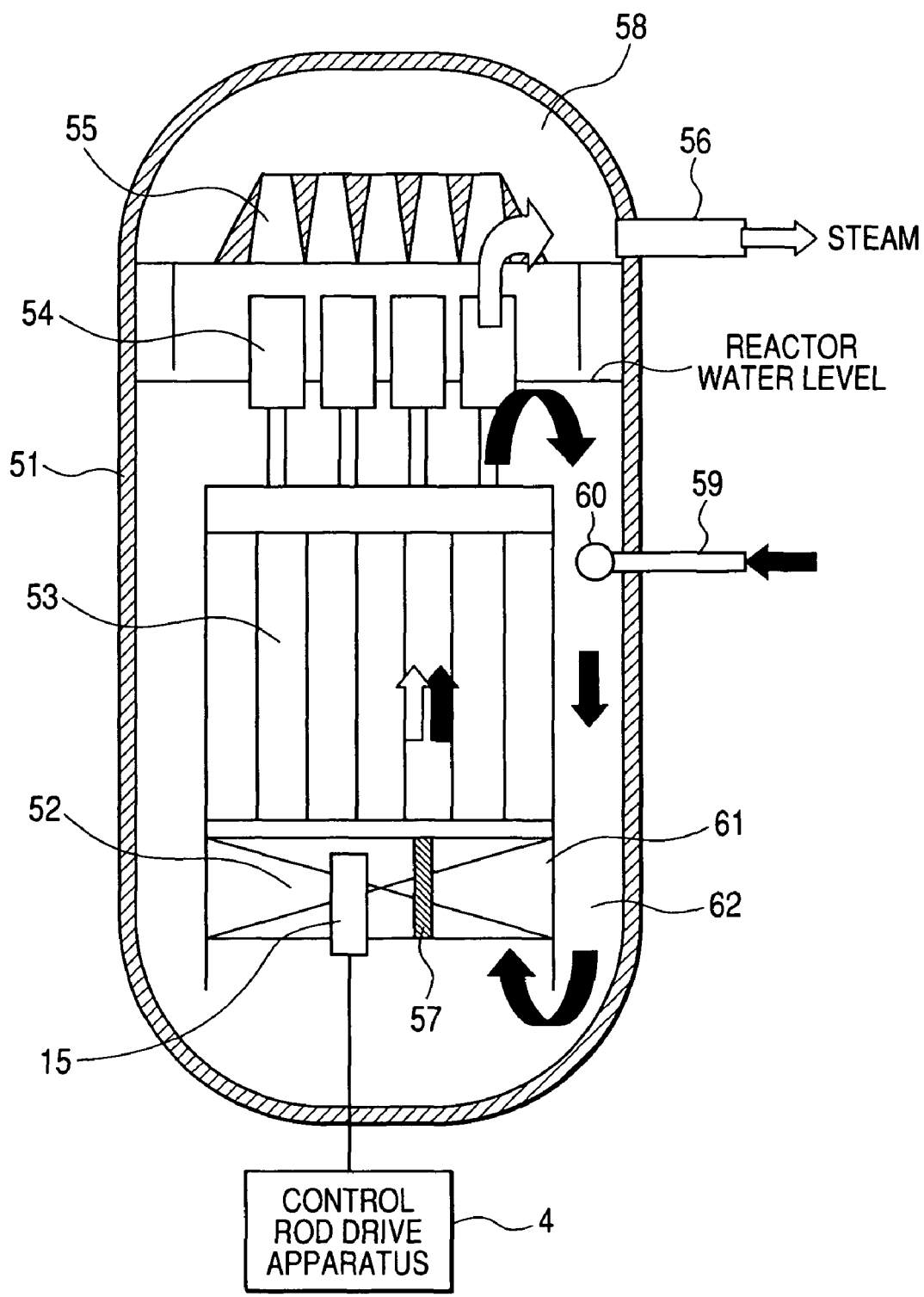
FIG. 2 is a longitudinal section view of the reactor of this embodiment.

One embodiment of the present invention will be described using FIG. 1 to FIG. 7. FIG. 1 shows a structure of the nuclear power generation equipment of this embodiment and FIG. 2 is a longitudinal section view of the nuclear reactor of this embodiment.

The nuclear reactor 6 is a natural circulation boiling water reactor. As shown in FIG. 2, a core 52 in which fuel assemblies are arranged is placed at the lower side in a reactor pressure vessel 51 of the nuclear reactor 6. A chimney 53 for increasing the natural circulation amount of the cooling water (coolant) is provided above the core 52. A steam separator 54 is fixed on an upper end portion of the chimney 53. The steam separator 54 separates the steam from the cooling water that passes the chimney 53. A steam dryer 55 for drying the steam separated at the steam separator 54 is arranged in the steam dome 58.

A main steam pipe 56 is provided a reactor pressure vessel 51 at the position of the steam dryer 55. The main steam pipe 56 is connected to turbines 7. A main steam adjustment valve 13 is provided the main steam pipe 56. A condenser 9 is connected to the turbine 7. A turbine bypass pipe having a bypass valve 14 is connected to the condenser 9. The turbine 7 is not shown in detail, but includes a high-pressure turbine and a low-pressure turbine. A moisture separator (or moisture separation heater) is provided between the high-pressure turbine and the low-pressure turbine. A generator 8 is connected to the turbine 7 and rotated by the turbine 7 and thereby generates power. The condenser 9 is connected to the reactor pressure vessel 51 through the feed water pipe 59. Feed water flow rate adjustment valves 11 are provided the feed water pipe 59. A one end of the feed water pipe 59 is connected to a feed water sparger 60 in the reactor pressure vessel 51. The feed water is fed through the feed water sparger 60 in the reactor pressure vessel 51. The feed water is mixed with the cooling water re-circulating in the reactor pressure vessel. The cooling water passes through the downcomer 62 which is between the core shroud 61 and reactor pressure vessel 51 and supplied to the core 53 from the lower side. A differential pressure gauge is provided a core support plate. The reactor flow rate that is obtained based on the differential pressure measured by the differential pressure gauge is fed back to the reactor power control apparatus 1.

The nuclear reactor 6 has control rods 15 being inserted into the core 52. Each of the control rod 15 is connected respectively to a control rod drive mechanism which drives the control rod 15. The control rod drive apparatus 4 is connected to each of the control rod drive mechanism and a control rod drive control apparatus 2. The feed water pump 10 and the feed water flow rate adjustment valve 11 are connected to a feed water control apparatus 18 and control the feed water flow rate in accordance with the operation command from feed water control apparatus 18 to adjust the reactor water level to the set value. The main steam adjustment valve 13 and the bypass valve 14 are connected to a turbine control apparatus 12.

The control rod drive control apparatus 2, the feed water control apparatus 18 and the turbine control apparatus 12 are connected to a reactor power control apparatus 1. The reactor power control apparatus 1 is connected to a process computer 17. The reactor power control apparatus 1 outputs control rod operation signal to the control rod drive control apparatus 2. Control rod device information and the like is fed back from the control rod drive control apparatus 2 to the reactor power control apparatus 1. Reactor water level set signal is output to the feed water control apparatus 18. Information of the reactor water level control results are fed back from the feed water control apparatus 18 to the reactor power control apparatus 1. Load set signal is output from the reactor power control apparatus 1 to the turbine control apparatus 12. The information of the control results are fed back to the turbine control apparatus 12 to the reactor power control apparatus 1. Generator power is input to the reactor power control apparatus 1.

Figure 3:
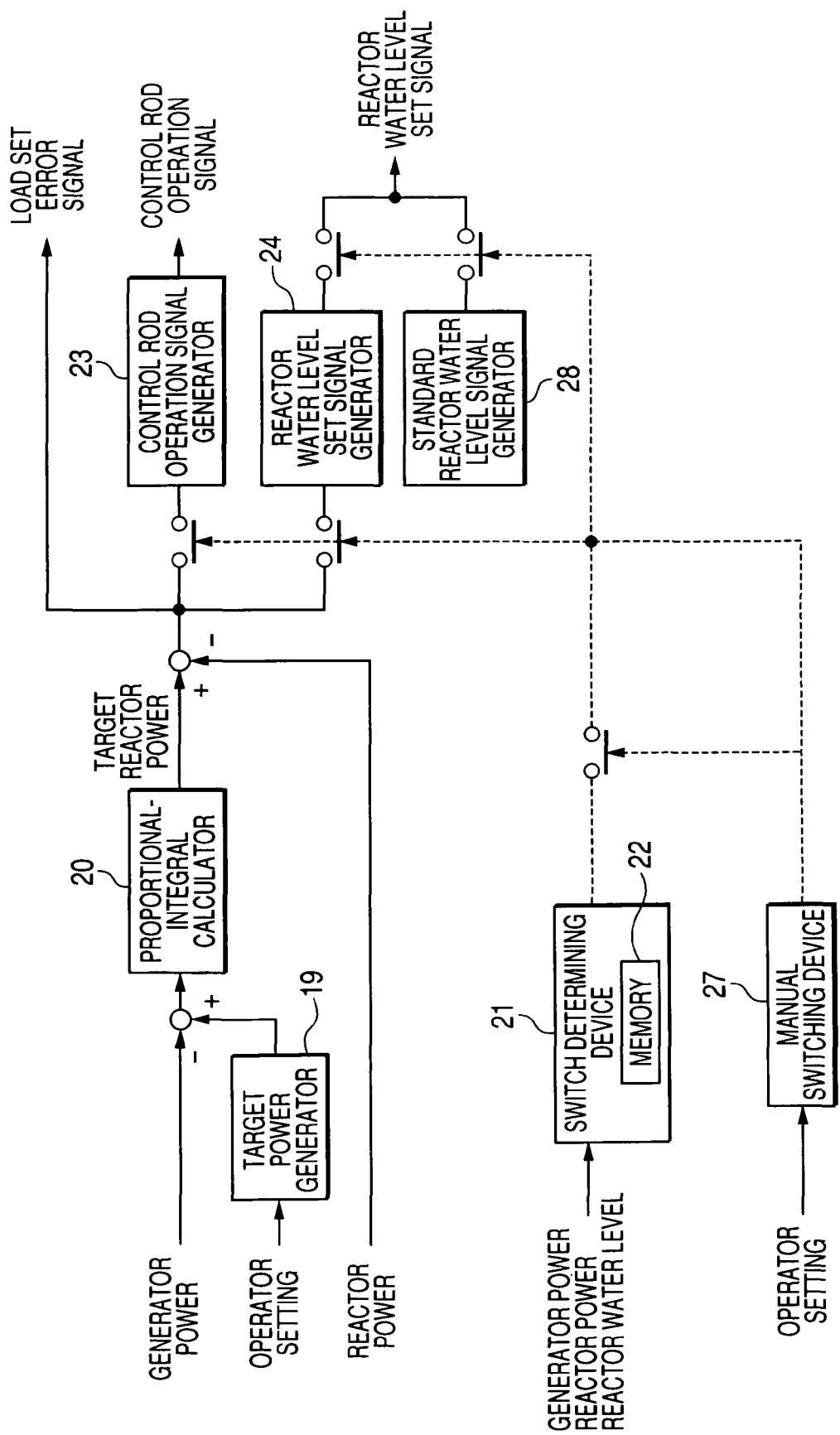
FIG. 3 is a structural diagram of reactor power control apparatus of this embodiment.

FIG. 3 shows the detail structure of the reactor power control apparatus 1. The reactor power control apparatus 1 has a target power generator 19 which generates the target generator power signal based on the target generator power value that is directly input by an operator using the input device, or based on the target generator power value that is set via the process computer 17. The generator power error which is the error between the target generator power signal from the target power generator 19 and the generator power that is fed back, is calculated by first subtractor. The proportional-integral calculator 20 is performed proportional-integral calculation based on the generator power error that is input. Reactor power error which is the error between target reactor power signal obtained by the proportional-integral calculator 20 and the reactor power is calculated by second subtractor. Control rod operation signal is generated at a control rod operation signal generator 23 which inputs the reactor power error. The reactor power error is output to the turbine control apparatus 12 as load set error signal. A water level set signal generator 24 inputs the reactor power error and generates reactor water level set signal. The reactor water level set signal is output from water level set signal generator 24. The load set signal may be used in place of the load set error signal for output to the turbine control apparatus 12.

The reactor power control apparatus 1 includes a switch determining device 21 which feeds back the generator power, the reactor power and the reactor water level and performs switching determination using switching rules and determination values stored in the memory 22 and a manual switching device 27 which is set by an operator. Normally, the output from the control rod operation signal generator 23, the output from the reactor water level set signal generator 24 and the output from the standard reactor water level signal generator 28 are switched by the signal from a switch determining device 21. In the case where a selected operation for manual switching is set at the manual switching device 27 by an operator, switch signal from the switch determining device 21 is switched to the OFF state using a switch. The control rod operation signal generator 23, the water level set signal generator 24 and the standard water level signal generator 28 are switched by the switching signal from the manual switching device 27.

The signal for the control status, that is, the signal for the manual operation status or automatic operation status is input from the feed water control apparatus 18. When manual control is OFF and automatic control is ON, the control rod operation signal is output to the control rod drive control apparatus 2 and the water level set signal is output to the feed water control apparatus 18.

Figure 4:
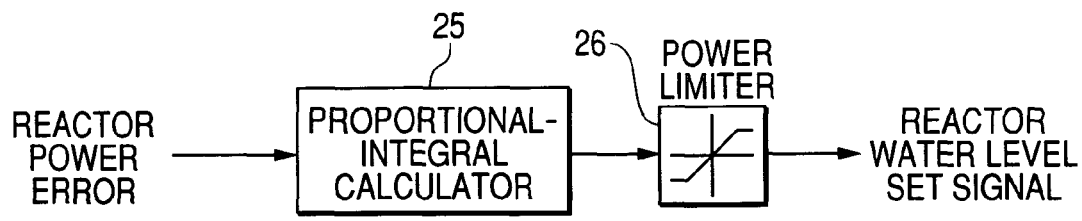
FIG. 4 is a structural diagram of the water level set value signal generator.

The reactor water level set signal generator 24 is comprised as shown in FIG. 4. The proportional-integral calculator 25 inputs the reactor power error signal and performs the proportion-integration and limits the output so as not to deviate from the water level setting limit. A power limiter 26 inputs the calculated value from the proportional-integral calculator 25. The power limiter 26 generates the reactor water level set signal.

The operation of the nuclear power generation equipment composed in this manner will be described. Because the output from the generator 8 is caused to follow the target generator power value input from the input device or the target generator power value set via the process computer 17, the reactor power control apparatus 1 controls the control rod drive apparatus 4 via the control rod drive control apparatus 2, and adjusts the reactor power.

The turbine control apparatus 12 inputs the load set error signal from the reactor power control apparatus 1, and controls the main steam adjustment valve 13 and the bypass valve 14 such that the generator power follows the changes in reactor power. The steam that passed through the main steam adjustment valve 13 is led to the turbine 7 and is rotated the turbine 7. Power is generated by the generator 8. The steam that drove the turbine 7 is condensed at the condenser 9 and become water. The water as the feed water returns again to the reactor pressure vessel 51 by the feed water pump 10.

At this time, the reactor power control apparatus 1 outputs the reactor water level set signal to the feed water control apparatus 18. Because the reactor power control apparatus 1 outputs the control rod operation command signal to the control rod drive control apparatus 2, it can perform the reactor power control using water level adjustment and power control using the control rod operation.

When the target value of the generator power and the change rate until the target value is reached are set by the operator, the target power generator 19 outputs the target generator power value which is to be output from time to time. The proportional-integral calculator 20 inputs the error between the target generator power value and the actual generator power value and calculates based on the input error, and then outputs the target reactor power value from time to time. Calculation of the target reactor power value is performed by fuzzy control and the like. As a result, it becomes possible to obtain calculation results which can be controlled smoothly.

In the case where nuclear reactor 6 is operated with fixed thermal power in prior to the generator synchronization or after the generator synchronization, the target reactor power value is set to control the reactor power in the time of start-up.

The error of the calculated target reactor power value and the actual reactor power value is output to the turbine control apparatus 12 as the load set error signal or the load set signal. The turbine control apparatus 12 adjusts the load set value such that the generator power follows the changes in reactor power. In addition, the reactor power error signal is output to the control rod operation signal generator 23 and the reactor water level set signal generator 24. At this time, the switch determining device 21 selects one of control rod following control, water level following control and standard water level control based on the generator power, the reactor power and the reactor water level, and the switching rules and the determination values stored in memory 22. When the control rod following control is selected, the reactor power error signal is input to the control rod operation signal generator 23. When the rector water level following control is selected, the reactor power error signal is input to the reactor water level set signal generator 24. In the case where the standard water level control is selected, the reactor water level set signal generator 24 does not output the reactor water level set signal, but the standard water level signal generator 28 outputs the standard reactor water level signal. Furthermore in the case where neither the control rod following control, the reactor water level following control nor the standard water level control is selected, the reactor power error signal is not input to the reactor water level set signal generator 24 and the standard water level signal generator 28.

When a selection operation is input to the manual switching device 27 by the operator, the switching signal of the switch determining device 21 turns OFF and one of the control rod following control, the reactor water level following control and the standard water level control is selected by the switching signal output from the manual switching device 27. According to this embodiment, it is possible that any one of the control rod following control, the reactor water level following control and the standard water level control.

In the control rod operation signal generator 23, the control rod operation signals are generated based on the switching rules by which in the case where the reactor power error is greater than a preset positive value, only one operation unit of the control rod is withdrawn, and in the case where the load is smaller than a preset negative value, only one operation unit of the control rod is inserted, and in all other cases, there is no operation of the control rod. The control rod operation signal generator 23 outputs the signals to the control rod drive operator 2.

The reactor water level set signal generator 24 performs the proportional-integral calculations, as shown in FIG. 4, and generates the reactor water level set signal. The power limiter 26 connected to the proportional-integral calculator 25 limits the water level set signal so as not be outside the reactor water level setting range. The reactor water level set signal is output from the power limiter 26 to the feed water control apparatus 18. The feed water control apparatus 18 controls the feed water pump 10 and the feed water flow rate adjustment valve 11 based on measured value of the reactor water and the reactor water level set signal. The feed water rate being supplying to the reactor vessel 6 is adjusted by the control, and the reactor water level is reached the set value.

In this manner, because the reactor water level set signal generator 24 is provided in the reactor power control apparatus 1, when the reactor power control using control rod operation is selected by the switch determining device 21, zero is input to the water level set signal generator 24 as the reactor power error signal. Thus, the reactor water level setting maintains a fixed value. Even when there is variation in the reactor water level when there are changes in the reactor power due to control rod operation, the reactor water level set value is never changed in the direction of water level variation. Thus, large reactor water level variations can be prevented.

Figure 5:
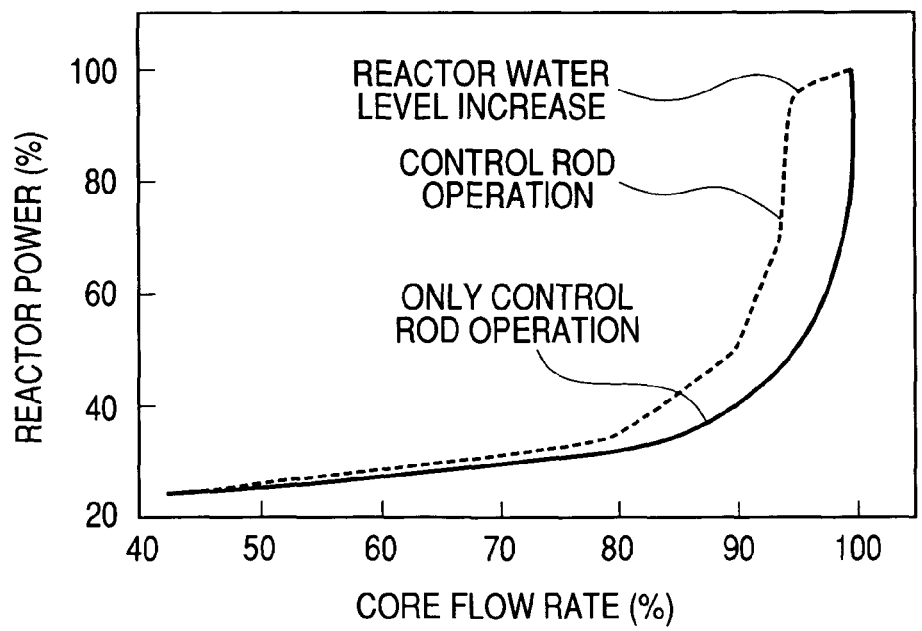
FIG. 5 is an explanatory drawing showing an example of start-up time reactor power control-reactor flow rate curve.

FIG. 5 shows an example of start-up time reactor power-reactor flow rate curve in the case where control is performed by the reactor power control apparatus of this embodiment. The solid line in FIG. 5 shows the increase characteristic of the reactor power using only control rod operation in case where the water level is raised to the normal position of the reactor water level, that is, the position slightly above the lower end of the steam separator 55 as shown in FIG. 2. In the case where the reactor power is increased to a rated value using only the control rod, the temperature of the fuel rod is sometimes reached the thermal limit value. In the case where the temperature of the fuel rod is reached the thermal limit value, the reactor power increase is sometimes stopped, because automatic exclusion or control rod operation stopping or the like is generated by the thermal limit monitoring device (not shown).

The broken line in FIG. 5 shows characteristic of the reactor power control of this embodiment using the control rod operation and the reactor water level adjustment. In the reactor power control, when the water level is reduced to the upper end vicinity of the chimney 53 and the natural circulation flow rate is reduced, the control rod is withdrawn from the core 52 with the reactor water level kept low, and the reactor power is increased to the rated value. The reactor power increase of a few % in the level where the reactor power reached the rated value is finally performed by the increase of the reactor flow rate being based on the reactor water level set value. By carrying out the reactor power in this manner, in the high output state, the control rod operation is avoided and the reactor power is adjusted by the reactor flow rate. Thus, local thermal parameters such as linear heating rate, which is the amount of heat generated per unit length of the fuel rod, and the minimum critical power ratio and the like can be prevented from approaching the limit value. For this reason, in this embodiment, because the thermal limit value is never reached and automatic exclusion or control rod operation restriction never occurs, the burden on the operator is lightened and extension of start-up period is prevented. The minimum critical power ratio herein refers to the minimum value of the ratio obtained by dividing the critical power CP by the current power BP for each of the fuel assemblies. The critical power is the reactor power where the fuel rod in the fuel assembly does not generate boiling transition (liquid film loss). The reactor power is controlled such that the minimum critical power ratio is about 1.3 as providing a margin. The critical power CP and the power BP can be obtained by the process computer 17 which performs reactor performance calculations based on the measured core flow rate, the reactor power and the thermal heat balance.

Because there are large changes in reactivity due to burnup of nuclear fuel, it is necessary to control reactivity in order to maintain fixed reactor power. However, because the range of reactivity change being obtained by the control rod operation is wide, the reactor flow rate must be controlled in order to perform fine adjustment of the reactor power.

Figure 6:
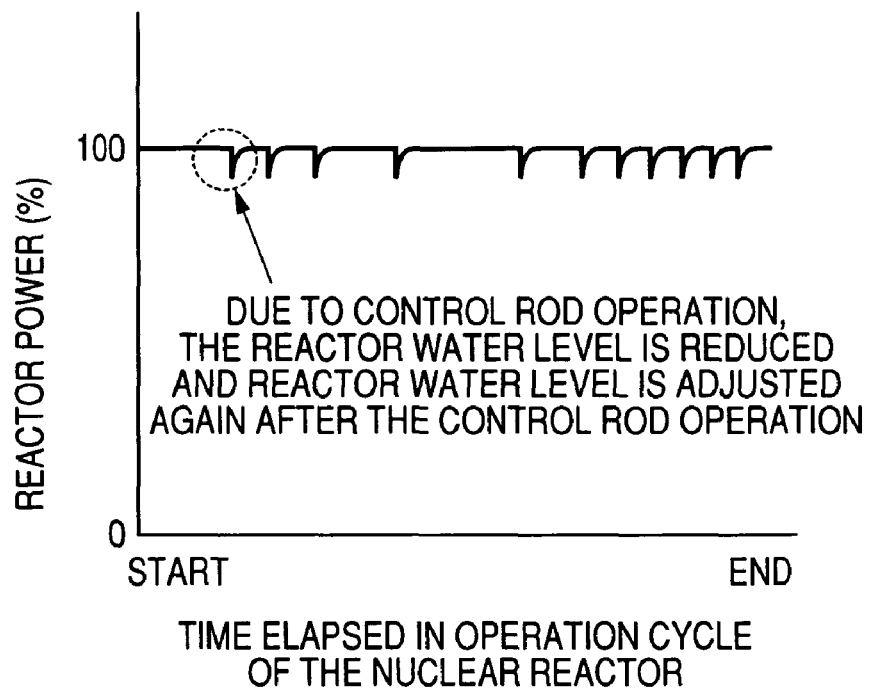
FIG. 6 is an explanatory drawing showing the method for fine adjustment of reactor power at the time of rated reactor power operation.
Figure 7:
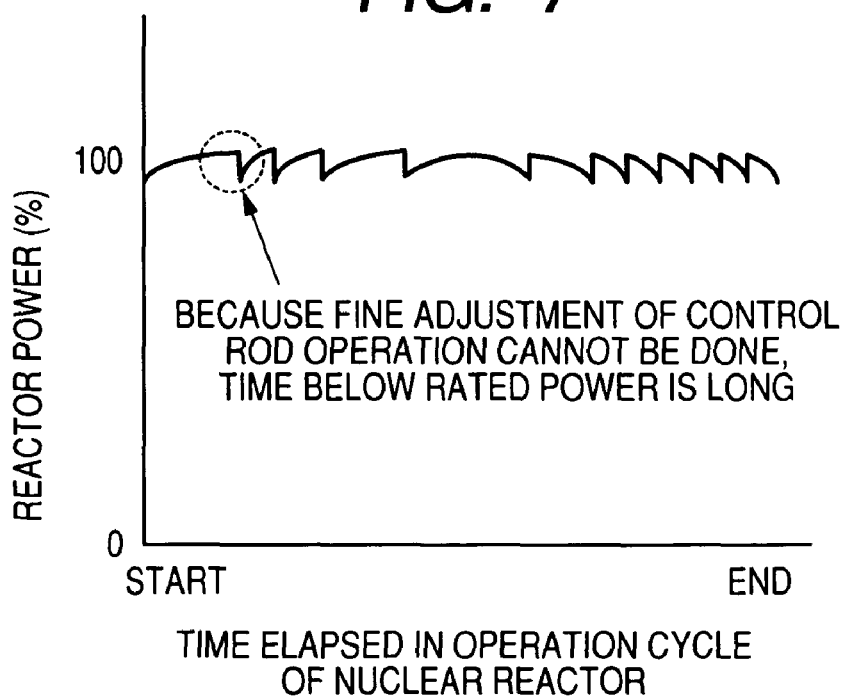
FIG. 7 is an explanatory drawing showing the method for fine adjustment of reactor power at rated reactor power operation.

When adjustment of the reactor power in rated reactor power operation is performed, because fine adjustment of the reactor power cannot be carried out, the operation period is long and loss is great as shown in FIG. 7. However, the fine adjustment of the reactor power can be performed by being reduced the reactor water level to low level. That is, the control rod can be withdrawn from the core 52 in the state of keeping the reactor water level at the low level, and the reactor power is increased. After the operation of the control rod, the fine adjustment of increase of the reactor power is performed by being increased the reactor water level. Thus, as shown in FIG. 6, the reactor power can be maintained the rated reactor power, and the total amount of power generation is greater than the case where only the control rod operation is performed.

Figure 8:
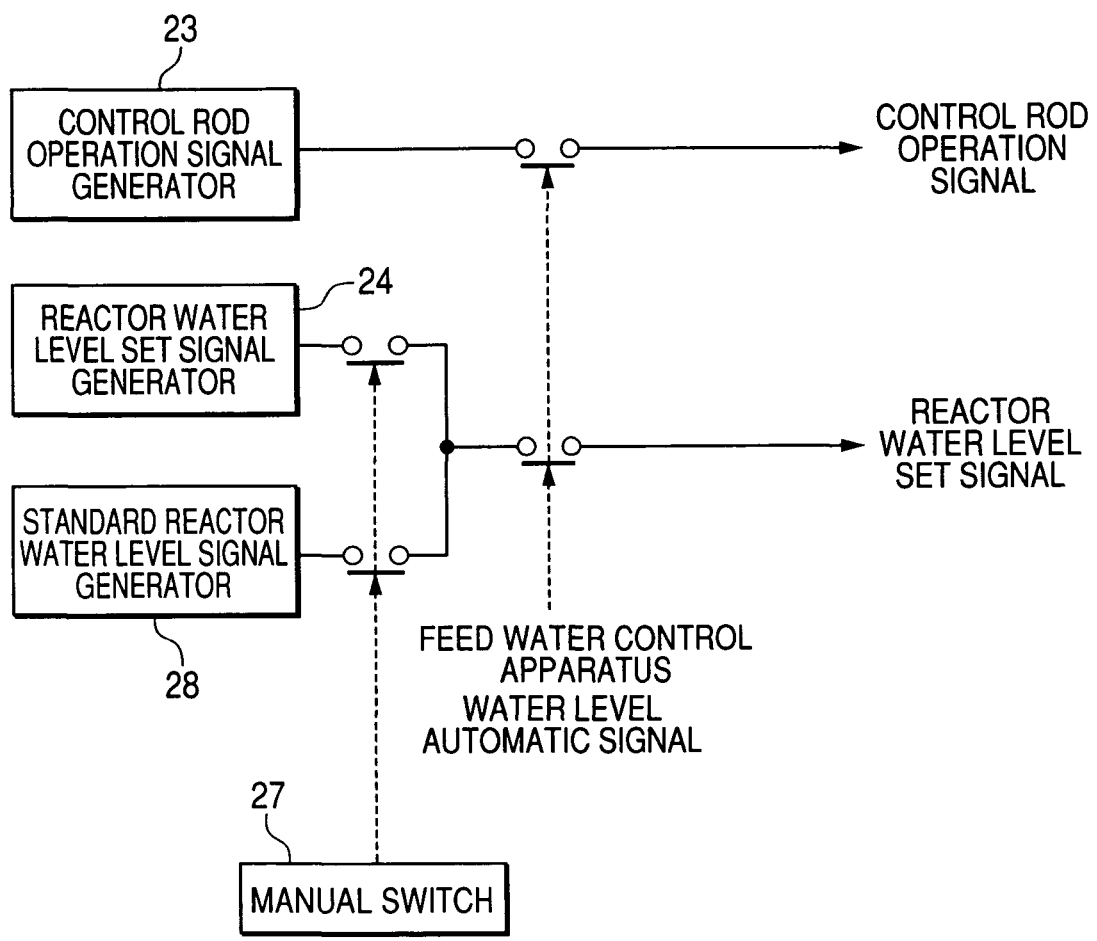
FIG. 8 is an explanatory drawing showing an example of automatic stopping in the case where reactor water level setting is manual, which is another example of the present invention.

A reactor power control apparatus 1 which is another embodiment of the present invention as shown in FIG. 8 performs the switching based on feed water control apparatus water level automatic signal. That is, the control rod operation signal from the control rod operation signal generator 23 and the reactor water level set signal from the reactor water level set signal generator 24 are output only when the feed water control apparatus water level automatic signal, which is automatically set from the feed water control apparatus 18, is detected. The feed water control apparatus water level automatic signal is output when the feed water setting value that is automatically set by the reactor power control apparatus 1 is used in the feed water control apparatus 18. In the case where the automatically set water level set value is used in the feed water control apparatus, the control rod operation signal, and the reactor water level set signal and the load error signal are output, while in the case where the automatically set water level set value is not used, the automation control of the reactor power by using the reactor power control apparatus 1 is stopped.

According to this embodiment, the overlapping of the reactor water level set value changes which are manually performed at the feed water control apparatus 18 and the reactor water level changes caused by reactor power changes which are performed at the power control apparatus 1 can be prevented and large reactor water level variation is prevented too.

Figure 9:
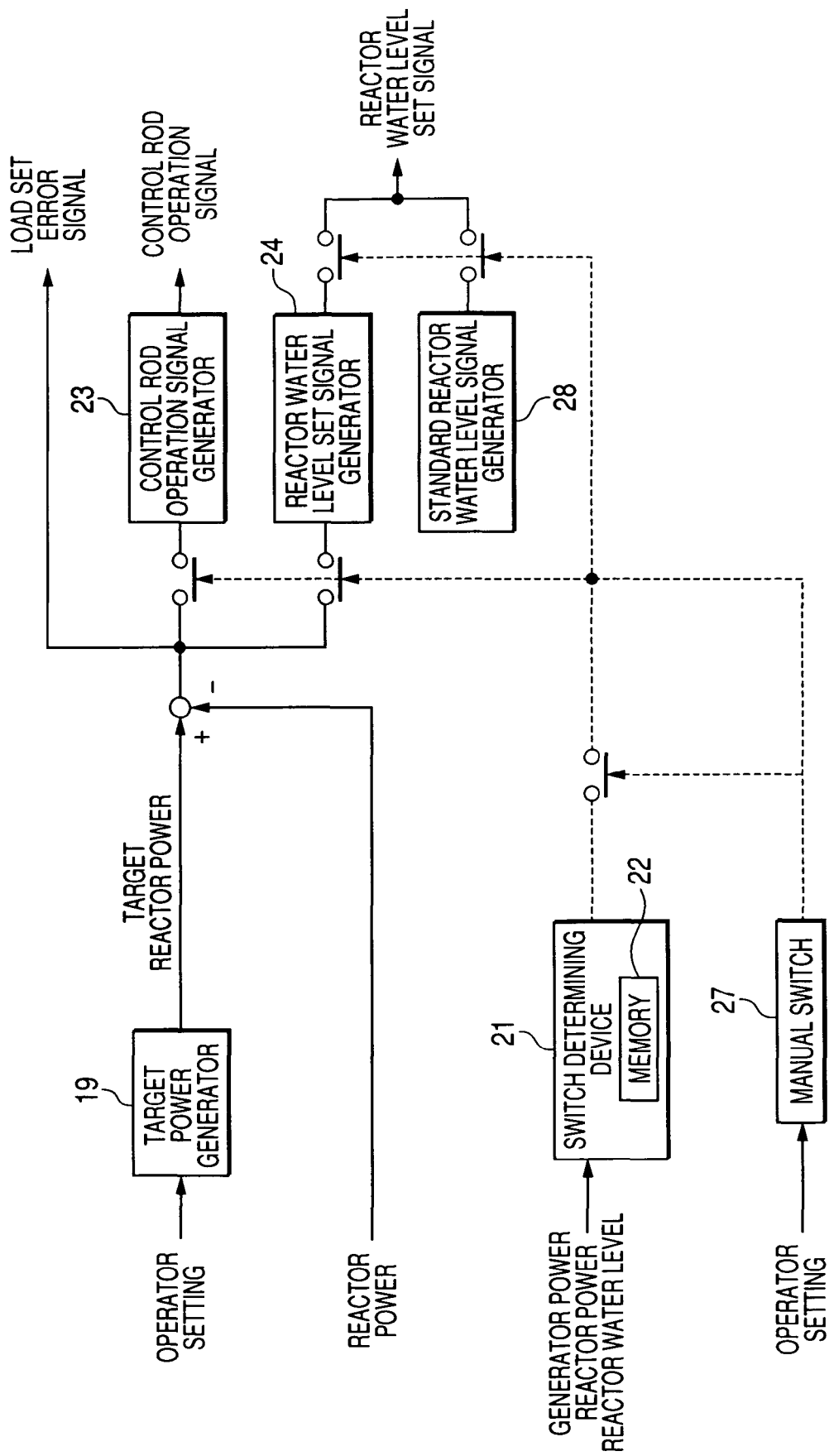
FIG. 9 is a structural diagram of a reactor power control apparatus which is another embodiment of the present invention.

FIG. 9 shows another embodiment of the present invention. The reactor power control apparatus 1 of this embodiment is comprised in the same manner as the example shown in FIG. 3. This embodiment has also the target power generator 19 which generates the target reactor power signal from the set value directly input by the operator from the input device provided in the power control apparatus 1. A subtractor calculates the reactor power error which is the error between target reactor power from the target power generator 19 and measured reactor power. The control rod operation signal generator 23 generates the control rod operation signal. The reactor power error is input to the turbine control apparatus 12 as the load set error signal. The reactor water level set signal generator 24 inputs the reactor power error and generates the reactor water level set signal. The standard reactor water level signal generator 28 generates the standard reactor water level signal. Any one of and the reactor water level set signal and the standard water level signal is output to the feed water control apparatus 18 by switching.

According to this embodiment, the reactor power can be controlled to follow the target value and it is possible to switch between control using control rod operation and control using control water level setting change.

Figure 10:
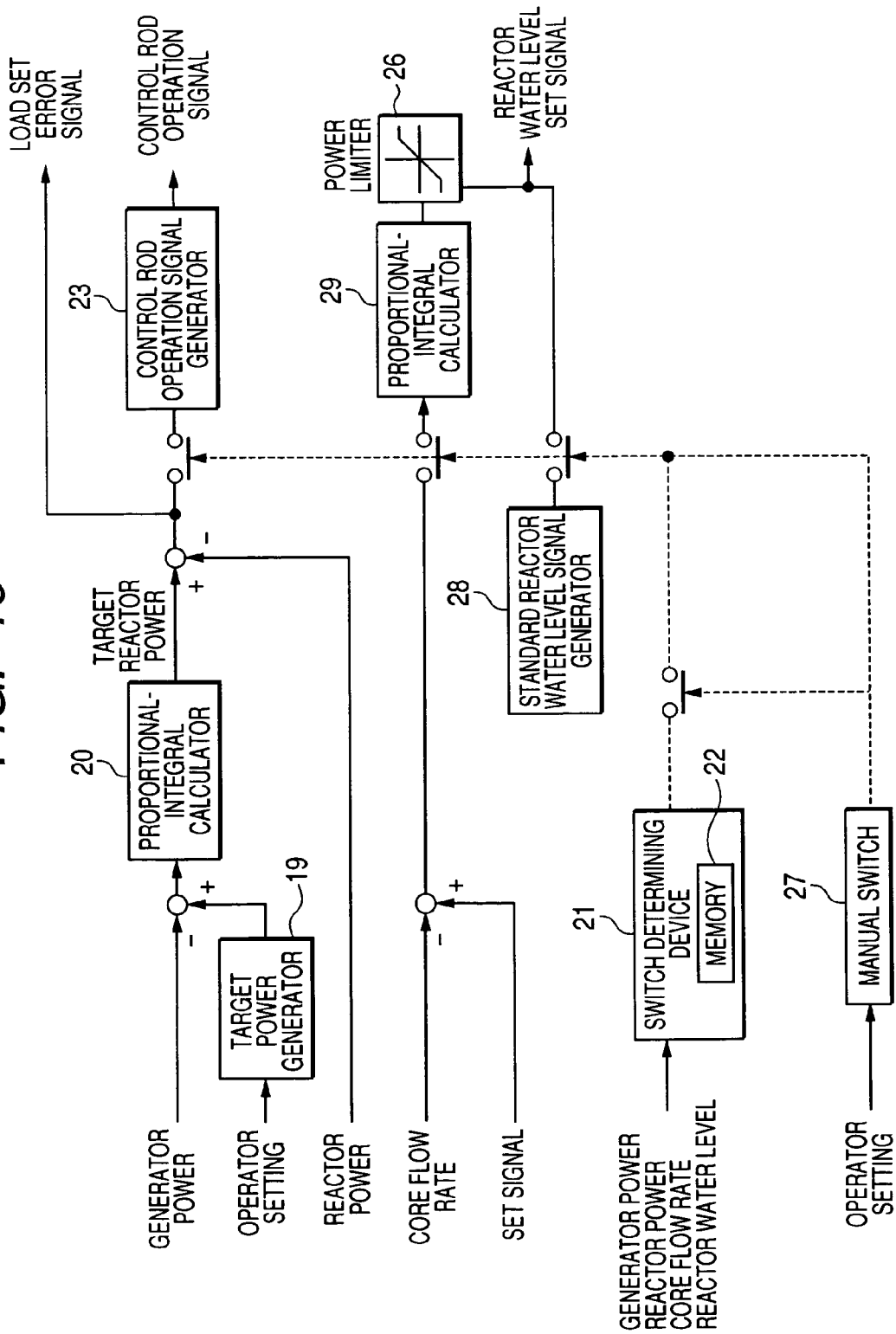
FIG. 10 is a structural diagram of a reactor power control apparatus which is another example of the present invention.

FIG. 10 shows another embodiment of the present invention. The reactor power control apparatus 1 of this embodiment is comprised in the same manner as the example shown in FIG. 3. This reactor power control apparatus 1 does not provide the water level set signal generator 24 shown in FIG. 3, and provides a power limiter 26 and a proportional-integral calculator 29. In this embodiment, as shown in FIG. 1, the error between the reactor flow rate that was fed back and the reactor flow rate set value signal is calculated. The switch determining device 21 switches the control rod following control and the core flow rate control based on the generator power, the reactor power, the core flow rate and the reactor water level. The set value for the core flow rate may be set by being input by the operator or may be automatically set by the reactor power control apparatus 1. Third subtractor calculates the core flow rate error which is the error between core flow rate set signal and the measured core flow rate. When the switch determining device 21 selects the core flow rate control, the core flow rate control is performed by outputting the core flow rate error from the third subtractor to the proportional-integral calculator 29, because first switching device becomes the state of ON by switching signal from the switch determining device 21. The standard reactor water level signal from the standard reactor water level signal generator 28 is not output, because second switching device becomes the state of OFF by the switching signal from the switch determining device 21. The proportional-integral calculator 29 calculates the reactor water level value such that the core flow rate error is 0. The power limiter 26 limits the reactor water level value within the reactor water level set range and outputs the water level set signal to the feed water control apparatus 18. In the case where the control rod following control is selected, the core flow rate error is not input to the proportional-integral calculator 29, because the first switching device becomes the state of OFF. Because the second switching device becomes the state of ON, The standard reactor water level signal as a fixed reactor water level set signal from the standard reactor water level signal generator 28 is output to to the feed water control apparatus 18.

According to this embodiment, the water level set value can be calculated based on the core flow rate error, and the thermal parameters and the core stability can be evaluated based on reactor core flow rate and the reactor power. Thus, the core state can be controlled based on reactor forecast calculation. Accordingly, this embodiment can manage the thermal parameters and the reactor core stability based on the forecast calculation.

Figure 11:
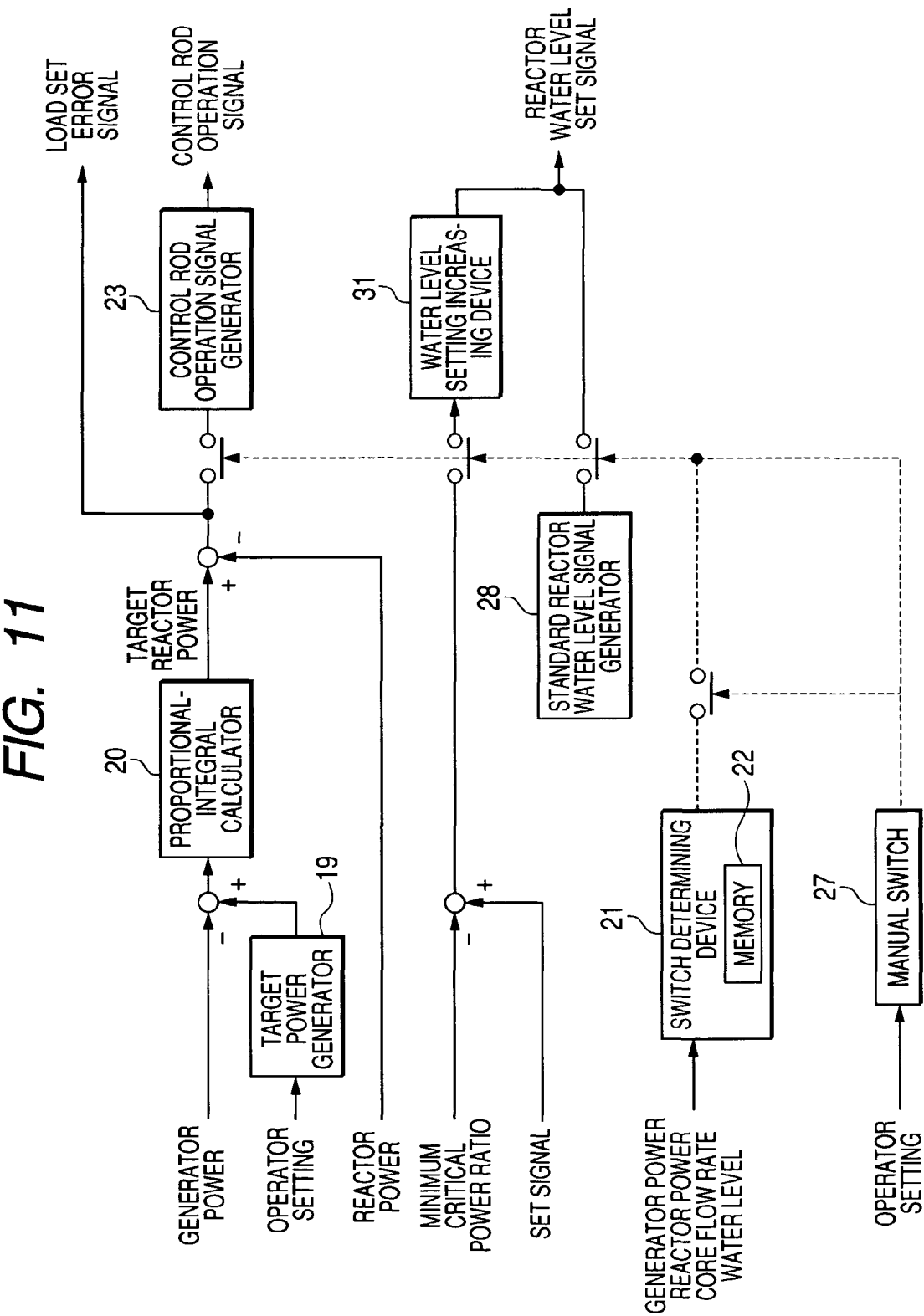
FIG. 11 is a structural diagram of a reactor power control apparatus which is another embodiment of the present invention.

FIG. 11 shows another embodiment of the present invention. The reactor power control apparatus 1 of this embodiment is comprised in the same manner as shown in FIG. 10. In this embodiment, instead of the core flow rate being fed back, the minimum critical power ratio is fed back and a water level setting increasing device 31 is provided instead of the proportional-integral calculator 29 and the power limiter 26. The set signal of the minimum critical power ratio may be set at about 1.3 as stated above for example, and may be set at 1.4 to include a margin.

The switch determining device 21 switches the control rod following control and thermal limit value control based on the generator power, the reactor power, the minimum critical power ratio and the reactor water level. The reactor water level control is performed based on the input reactor water level signal the feed water control apparatus 18. That is, when first switching device is the state of ON, the minimum critical power ratio error which is error between the minimum critical power ratio and the set signal is input from substractor to the water level setting increasing device 31. The water level setting increasing device 31 increases the reactor water level set value and outputs the increased the reactor water level set value as the reactor water level set signal to the feed water control apparatus 18A, in the case where the minimum critical power ratio is positive and the reactor water level set value is less than the set upper limit. The water level setting increasing device 31 does not change the reactor water level set signal, in the case where the minimum critical power ratio error is negative. In the case where the control rod following control is selected in the switch determining device 21, the minimum critical power error which is 0 inputs to the water level setting increase device 31 and a fixed water level set signal is output from the water level setting increase device 31.

According to this embodiment, because the reactor water level set value can be calculated based on the thermal control value error, the thermal limit value is never reached and automatic exclusion and control rod operation restriction never occurs. Thus, the burden on the operator is lightened and extension of start-up period is prevented.

According to this embodiment, in the natural circulation boiling water reactor, the reactor power controls using control rod operation and reactor water level adjustment are performed at once by the reactor power control apparatus 1. Thus, overlapped control in the same direction of variation in reactor water level due to reactor power changes in the time of the control rod operation and reactor water level setting changes due to the feed water control is prevented, and stable reactor power control is realized by reactor water level adjustment and a large water level adjustment range is ensured. Thus automatic reactivity control in which control rod operation and reactor water level adjustment are combined becomes possible and fine adjustment of reactor power in rated reactor power vicinity is performed and the low thermal limit value is avoided.

Another embodiment of the present invention will be described with reference to FIG. 12-FIG. 20.

Figure 12:
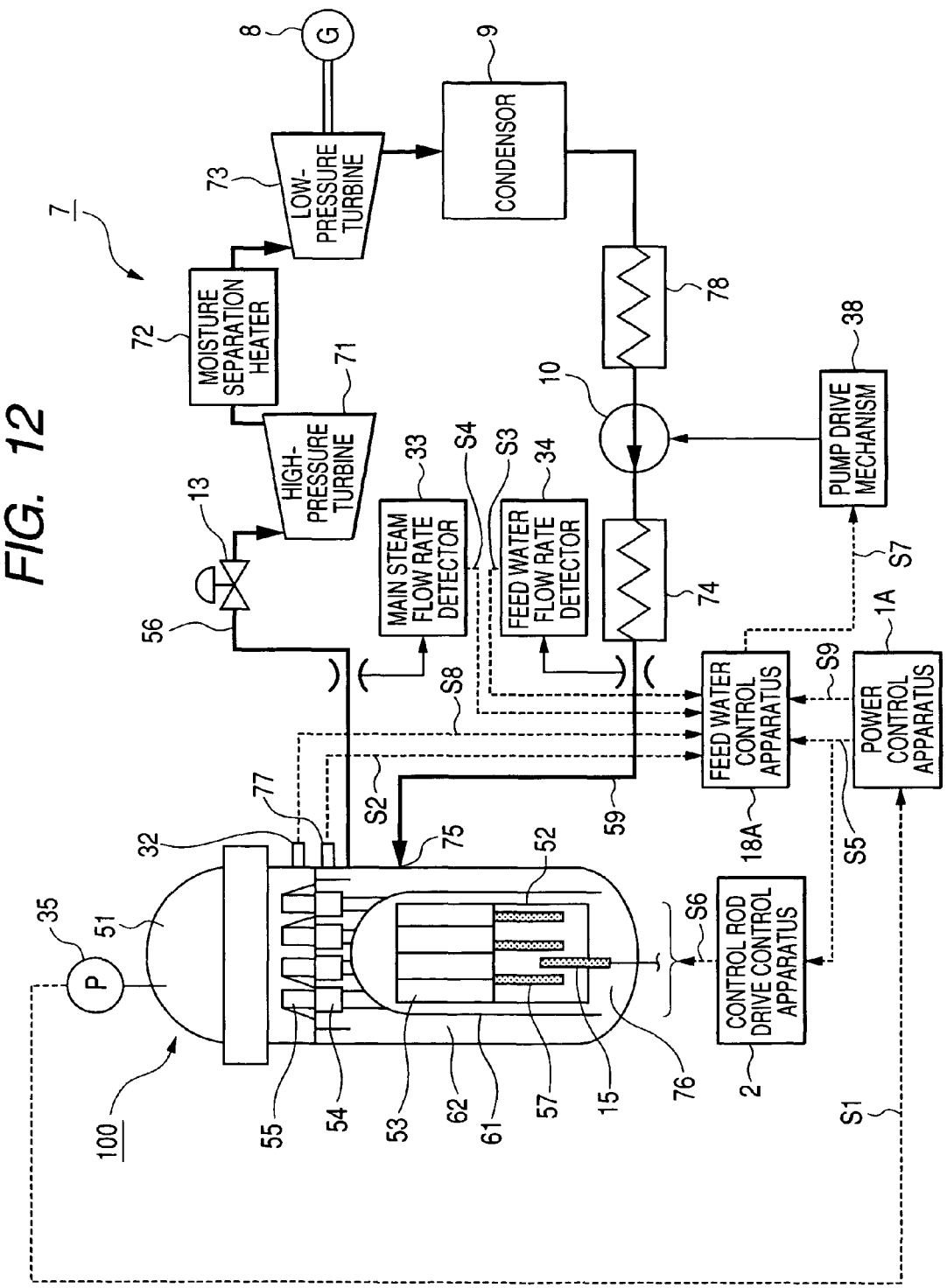
FIG. 12 is structural diagram of an example of a nuclear power generation plant and a control system using the nuclear power generation plant of another embodiment of the present invention.

FIG. 12 shows a pattern diagram showing the overall structure of the nuclear power generator plant including the boiling water reactor (BWR hereinafter) of the natural circulation type and its control system.

As shown in FIG. 12, the nuclear power generation plant of this embodiment comprises a natural circulation BWR 100 and a turbine system 7 connected to the natural circulation BWR 100. The natural circulation BWR 100 comprises a reactor pressure vessel 51, a plurality of fuel assembly 57 in which a plurality of fuel rods have been arranged, a core 52 arranging the fuel assemblies 57 and placed in the reactor pressure vessel 51, and a cylindrical core shroud 61 surrounding the core 52 in the reactor pressure vessel 51. A plurality of control rods are placed in the reactor pressure vessel 51 and control the reactivity of the core 52. The control rods are inserted into the space formed between the fuel assemblies and withdrawn from the space. The lower part of the reactor pressure vessel 51 which is not shown, provides a plurality of control rod drive mechanism which drive each of the control rod 15 in the vertical direction. The control rod adjusts the reactor power, or in other words the core power, and is controlled by the control rod drive control apparatus 2.

At the inside of the core shroud 61, there are coolant ascending paths in which the coolant ascends. Downcomer 62 which is coolant descend path is formed between the core shroud 61 and the reactor pressure vessel 7. The coolant descends in the downcomer 62. The chimney 53 which is a device for being increased the natural circulation flow rate is provided at the upper portion of the core 52. A steam separator 54 and a steam dryer 55 are placed above the chimney 53.

The turbines 7 include a high-pressure turbine 71 and a low-pressure turbine 73. A main steam pipe 56, and a feed water pipe 59 which supplies coolant are connected to the reactor pressure vessel 51. The steam generated in the core 52, or in other words, in the reactor pressure vessel 51 is supplied to the main steam pipe 56. The main steam pipe 56 is connected to the high-pressure turbine 71 via the steam adjustment valve 13 and is also connected to the low-pressure turbine 73 via the moisture separator (or the moisture separation heater) 72. The high-pressure turbine 71 and the low-pressure turbine 73 are connected generator 8. The steam adjustment valve 13 is an adjustment valve for adjusting the flow rate of steam that flows into the high-pressure turbine 71 through the main steam pipe 56. The flow rate of steam in the main steam pipe 56 is detected by the main steam flow rate detector 33, and the detection signal thereof which is the reactor steam flow rate signal S4 is input to the feed water control apparatus 18A which will be described hereinafter.

A condenser 9 is provided the outlet port of the low-pressure turbine 73. The condenser condenses the steam exhausted from the low-pressure turbine 73. The feed water pipe 59 is connected to the condenser 9 and the reactor pressure vessel. A low-pressure feed water heater 78, a feed water pump 10 and a high-pressure feed water heater 74 are provided the feed water pipe 59. Feed water as cooling water (coolant) is fed to the reactor pressure vessel 51. The feed water flow rate is detected by the feed water detector 34. The feed water flow rate signal S3 which is the detection signal is input from the feed water detector 34 to the feed water control apparatus 18A which will be described hereinafter.

The low-pressure feed water heater 78 heats the feed water supplied from the condenser 9. The feed water pump 10 pressurizes the feed water and supplies it to the reactor pressure vessel 51. The high-pressure feed water heater 74 heats further the feed water. The rotation speed of the feed water pump 10 is controlled so as to correspond with feed water flow rate by the pump drive mechanism 38 being described hereinafter. The pump rotation speed command S7 is supplied from the feed water control apparatus 18 to pump drive mechanism 38.

In the natural circulation BWR 100, the two-phase flow of the cooling water which was heated in the core 52 and of which the portion boiled to become steam ascends up in the chimney 53. The steam is separated from the two-phase flow of the cooling water in the steam separator 54. Further, the fine water droplets being included the steam are separated by the steam dryer 55. After the fine water droplets being included the steam are separated, the steam is exhausted from the reactor pressure vessel 51 to the main steam pipe 56 and the cooling water becomes re-circulated water which descends in the downcomer 62. The cooling water which descends in the downcomer 62 and the cooling water which ascends in the coolant ascend path and passes in the core 52 and the chimney 53 are separated by the core shroud 61 and never mix with each other. The cooling water which flows in the downcomer 62 is mixed with the feed water fed from the water nozzle 75 of the feed water pipe 59, and is then supplied from the lower portion of the core 52 through the lower plenum 76.

In the reactor pressure vessel 51, the volume density of the two-phase flow of the cooling water which ascends in the chimney 53 is less than that of the single-phase flow of the cooling water which descends in the downcomer 62. The cooling water is circulated naturally due to this difference in density.

The steam exhausted to the main steam pipe 56 from the reactor pressure vessel 7 passes through the steam adjustment valve 13 and is led to the high-pressure turbine 71, and then is then led to the low-pressure turbine 73 via the moisture separation heater (or the moisture separator) 72. The steam is rotated the turbines 7 and the generator 8 which is connected to the turbines 71 and 73.

The steam caused the low-pressure turbine 71 to rotate is introduced into the condenser 9 and condensed. The cooling water obtained by the condensation of the steam in the condenser 9 is pressurized by the feed water pump 10 and returned to the reactor pressure vessel 51 through the feed water pipe 59. The cooling water from the condenser 9 is heated to a suitable temperature by the low-pressure feed water heater 78 and the high-pressure feed water heater 10 at some point in the feed water pipe 59.

Two reactor water level detectors 77 and 32 are mounted inside the reactor pressure vessel 51 and they detect the reactor water level in the reactor pressure vessel 51. The range of each of the water level detectors 77 and 32 is set such the range for detecting the reactor water level is different. The detected output of one of the detectors 77 and 32 is used in accordance with the target reactor water level control range for reactor water level control of this example. The water level detector 77 outputs first reactor water level detection signal S2 to the feed water control apparatus 18A. The water level detector 32 outputs second reactor water level detection signal S8 to the feed water control apparatus 18A.

A pressure sensor 35 for detecting the pressure in the reactor pressure vessel 51 is provided also the reactor pressure vessel 51. The pressure sensor 35 outputs reactor pressure signal S1 to the reactor power control apparatus 1A. The reactor power control apparatus 1A outputs reactor power demand signal S5 and the load demand error signal S9 based on the input reactor pressure signal S1. The reactor power demand signal S5 is input to the control rod control apparatus 2. The load demand error signal S9 is input to the feed water control apparatus 18A.

The control rod control apparatus 2 outputs the control rod drive command S6 to the control rod drive mechanism connected with the control rod 15 based on the reactor power demand signal S5. The feed water control apparatus 18A generates pump rotation speed command S7 based on the reactor water level detection signal S2 or S8, the feed water flow rate signal S3, the steam flow rate signal S4, the reactor power demand signal S5 and the load demand error signal S9 and outputs the pump rotation speed command S7 to the pump drive mechanism 38.

Figure 13:
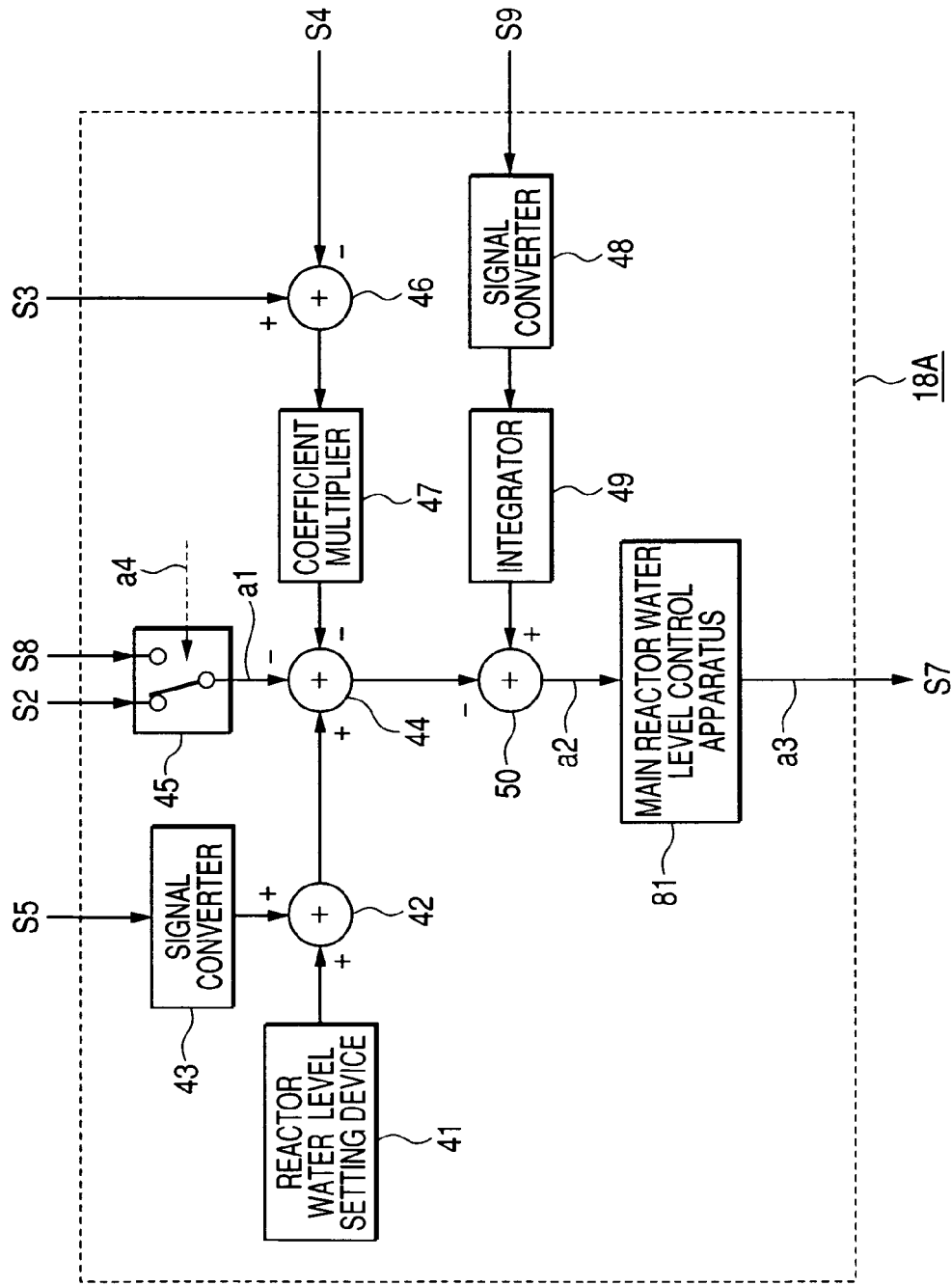
FIG. 13 is a structural diagram an example of a feed water control apparatus of this embodiment.

FIG. 13 shows a structural example of the feed water control apparatus 18A shown in FIG. 12. The feed water control apparatus 18A comprises a reactor water level setting device 41, a adder 42, signal converters 43, 48, subtractors 44, 46 and 50, a switch 45, a coefficient multiplier 47, a integrator 49 and a main reactor water level control apparatus 81. The reactor water level setting device 41 outputs a reactor water level set signal to the adder 42. The signal converter 43 inputs the reactor power demand signal S5 from the power control apparatus 1A and generates the reactor power demand signal having the required characteristics. The adder 42 inputs the reactor power demand signal and added its signal to the water level set signal. The addition output from the adder 43 is output to the subtractor 44.

The first reactor water level detection signal S2 and the second reactor water level detection signal S8 are input to the switch 45 of the feed water control apparatus 18A. One of the reactor water level detection signals a1 is selectively input to the subtractor 44. The switching of the switch 45 is controlled by the water level signal switching signal a4. The subtractor 46 inputs the feed water flow rate signal S3 and the steam flow rate signal S4, and calculates the difference in the feed water flow rate signal S3 and the steam flow rate signal S4. The coefficient multiplier 47 inputs this difference, and converts to the value of the multiplied coefficient. The value of the multiplied coefficient is input to the subtractor 44.

The subtractor 44 subtracts the water level detection signal a1 output from the switch 45 and the output from the coefficient multiplier 47 from the output from the adder 42, and generates the subtraction output. The subtraction output from the subtractor 44 is input to the subtractor 50. The load demand error signal S9 is input to the signal converter 48 and the characteristics of the load demand error signal S9 are converted by the converter 48. The converted load request error signal S9 is input to the integrator 49 and integrated, and the integrated signal is input to the subtractor 50.

The subtractor 50 subtracts the outputs of the subtractor 44 from the integrated signal of the load request error signal output from the integrator 49, and generates reactor water level error signal a2 which is the subtraction signal. The reactor water level error signal a2 is input to the main water level control apparatus 81. The main water level control apparatus 81 generates the main water level control apparatus output signal a3 based on the reactor water level error signal a2, and outputs the main water level control apparatus output signal a3 to the pump drive mechanism 38 (FIG. 12) as the pump rotation speed command S7 which is output signal from the feed water control apparatus 18A.

Figure 14:
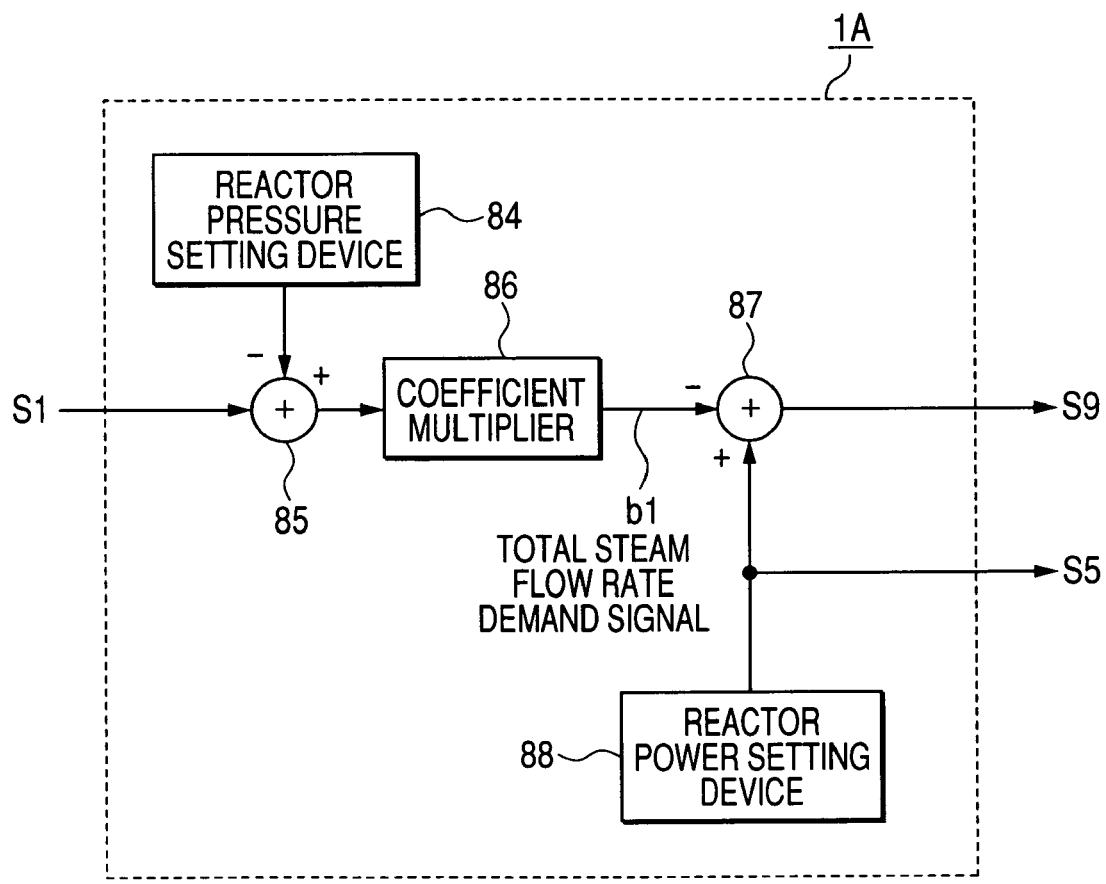
FIG. 14 is a structural diagram of an example of the power control apparatus of this embodiment.

FIG. 14 shows a structural example of the reactor power control apparatus 1A shown in FIG. 12. The reator power control apparatus 1A comprises a reactor pressure setting device 84, subtractors 85, 87 a coefficient multiplier 86 and a reactor power setting device 88. The subtractor 85 calculates the difference between the reactor pressure signal S1 from the pressure sensor 35 and the reactor pressure set signal from the reactor pressure setting device 84. The coefficient multiplier 86 inputs the difference signal from subtractors 85 and obtains the total steam flow rate demand signal b1 as the difference signal having prescribed characteristics.

The total steam flow rate demand signal b1 is input to the subtractor 87. The subtractor 87 calculates the difference between the reactor power set signal from the reactor power setting device 88 and the total steam flow rate demand signal b1, and generates the load demand error signal S9. The output from the reactor power setting device 88 is output without being converted as the reactor power demand signal S5.

It is to be noted that the feed water flow rate control is performed by the feed water control apparatus 18A shown in FIG. 13, in the case of this embodiment, in the case where basically reactor power is reached in a rated state and is in stable state.

In this embodiment, the state in which control of feed water being supplied to the reactor is performed at the feed water control apparatus 18A will be described.

Figure 15:
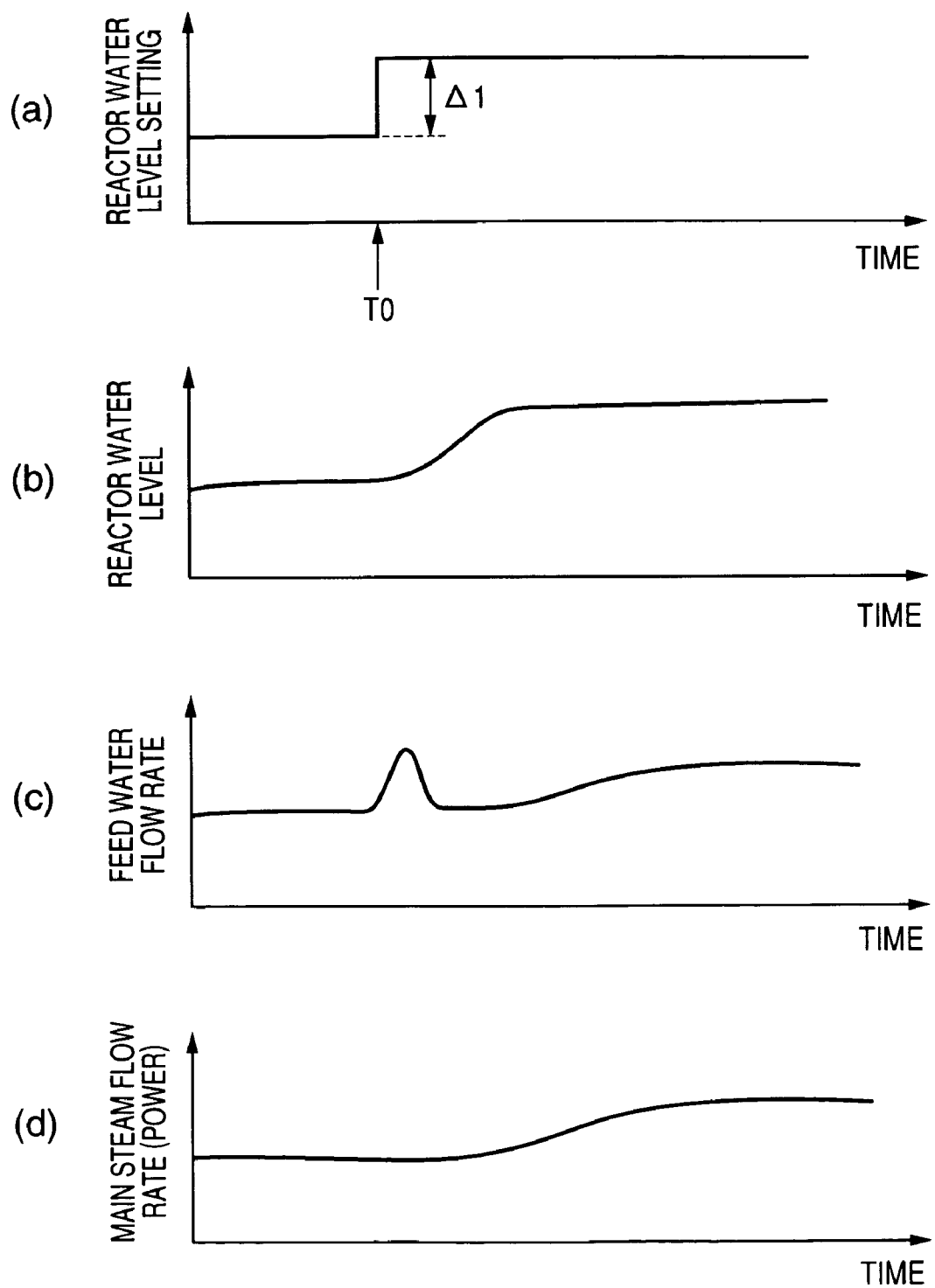
FIG. 15 is a timing chart showing an example of water level control of this embodiment.

FIG. 15 shows an example of the case in which reactor water level setting is performed by changes in the reactor power demand signal S5 and the reactor water level is controlled based on the set reactor water level. This example is the case in which there was reactor power change instruction, and FIG. 15 in particular is an example of the case where there was instruction to increase the reactor power. Because there is instruction to increase reactor power, the reactor power demand signal S5 input to the signal converter 43 (FIG. 13) increases. Thus, as shown in FIG. 15(a), the reactor water level set signal (output from the adder 42) in the feed water control apparatus 18A is increased only the value Δ1 which is corresponds to the amount of the reactor power increase at the timing T0 which has been instructed. When the reactor water level set signal was increased in this manner, as shown in FIG. 15(b), the reactor water level is increased comparatively quickly. As shown in FIG. 15(c), the feed water flow rate also gradually increases as the reactor power gradually increases. In addition, as shown in FIG. 15(d), the main steam flow rate which is corresponds to the reactor power increases. It can grasp that the reactor power gradually increases.

Figure 16:
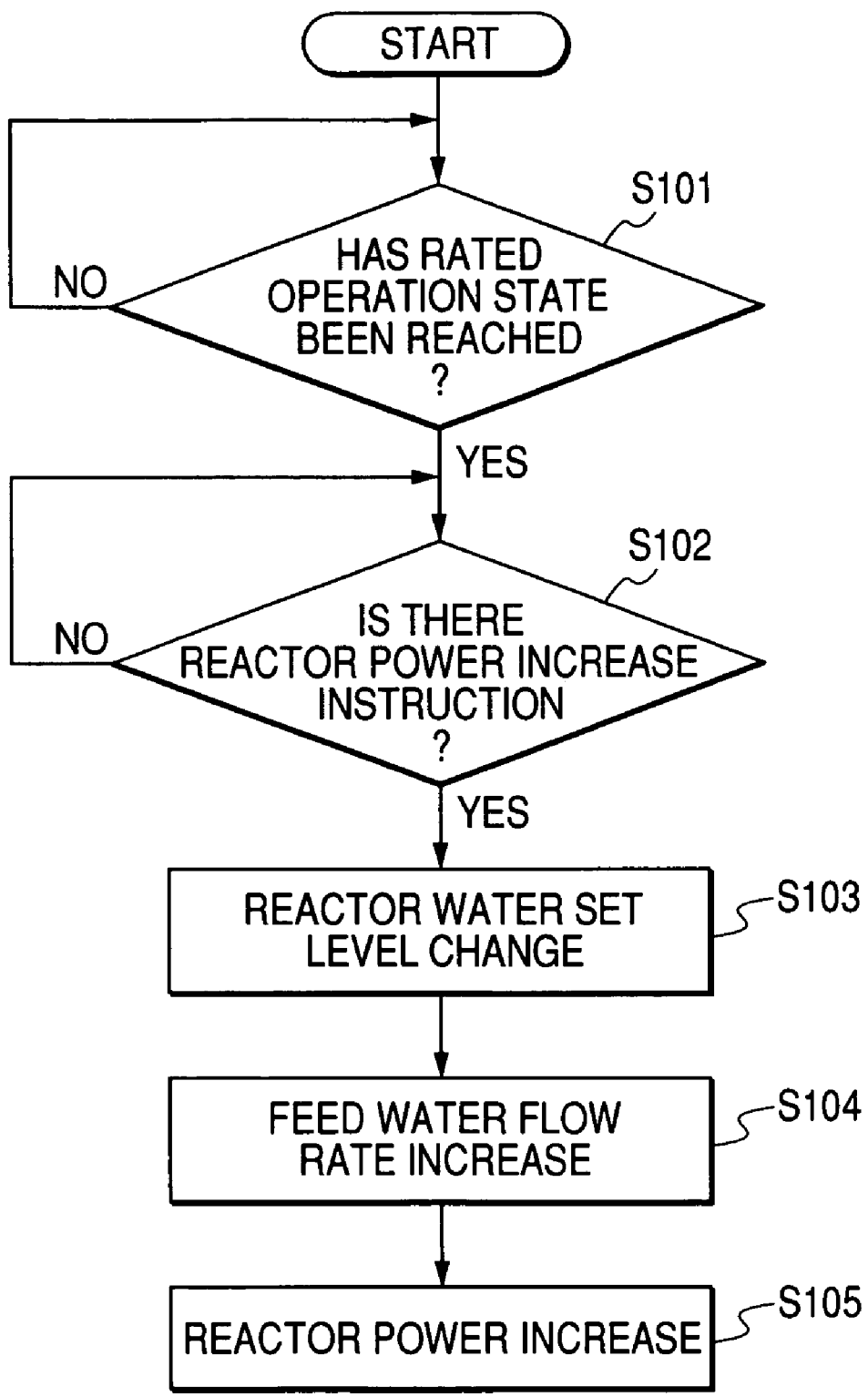
FIG. 16 is a flowchart showing the control process status in the example of FIG. 15.

FIG. 16 shows a flowchart the method for controlling the feed flow rate shown in FIG. The flowchart in FIG. 16 will be described in the following. First a determination is made as to whether the reactor power has exceeded a set level and reached a rated operation state in which the reactor power within a set range is maintained (Step S101). When the rated operation state has been determined, the control of this example is possible and a determination is made as to whether there is reactor power increase instruction in this example (Step S102). When there is the reactor power increase instruction, change processing for the reactor water set level is performed by the feed water control apparatus 18A (Step S103). The feed water flow rate is increased based on changed reactor water set level (Step S104). As shown in FIG. 15(d), finally the reactor power is gradually increased (Step S105). It is to be noted that the example of FIG. 15 and FIG. 16 show the case in which the rector power is increased, but the feed water control for decreasing the reactor power may be performed by replacing "increase" with "decrease" in the control process shown in FIG. 16.

Figure 17:
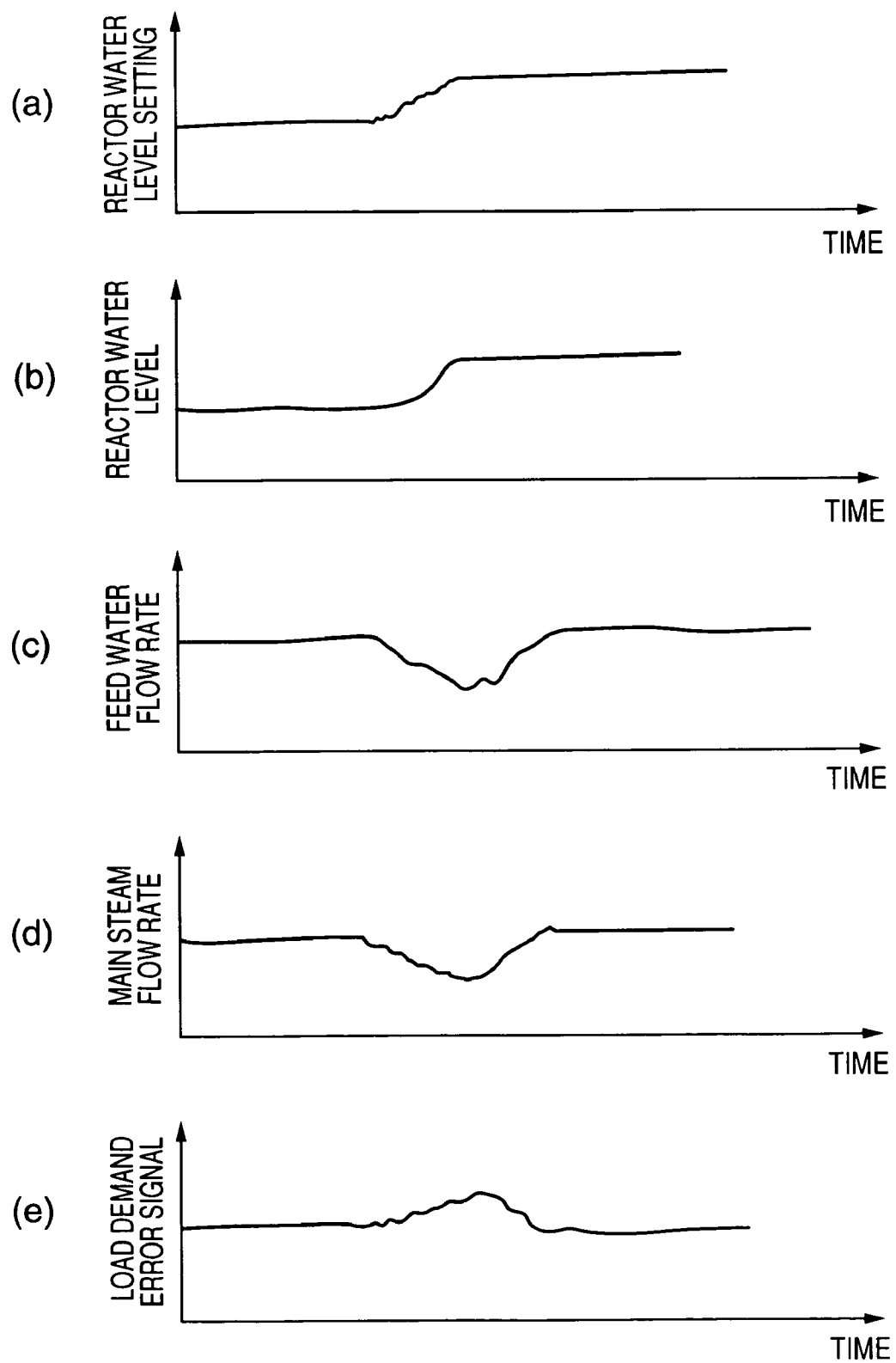
FIG. 17 is a timing chart showing an example of reactor water level control in this embodiment.

When there is variation in the reactor power, the example of the case in which the process for minimizing this variation is performed by feed water flow rate is described using FIG. 17. In this example, as shown in FIG. 17(d), it is supposed that in the rated operation state, for whatever reason, the reactor power temporarily decreases. In this case, as shown in FIG.

17(a), the reactor water level set value gradually increases when the reactor power decreases. As shown in FIG. 17(b), the reactor water level increases too. The water level flow rate temporarily decreases as shown in FIG. 17(c). The load demand error signal S9, which the reactor power control apparatus 1A outputs, increases when the reactor power decreases as shown in FIG. 17(e).

By performing control in this manner and increasing the reactor water level shown in FIG. 17(a), the decrease in the reactor power is restrained, and then gradually returns to the original reactor power. At the state where the reactor power returns to the original level, the feed water flow rate also returns to the original feed water flow rate, and the load demand error signal S9 also gradually returns to the original value.

Figure 18:
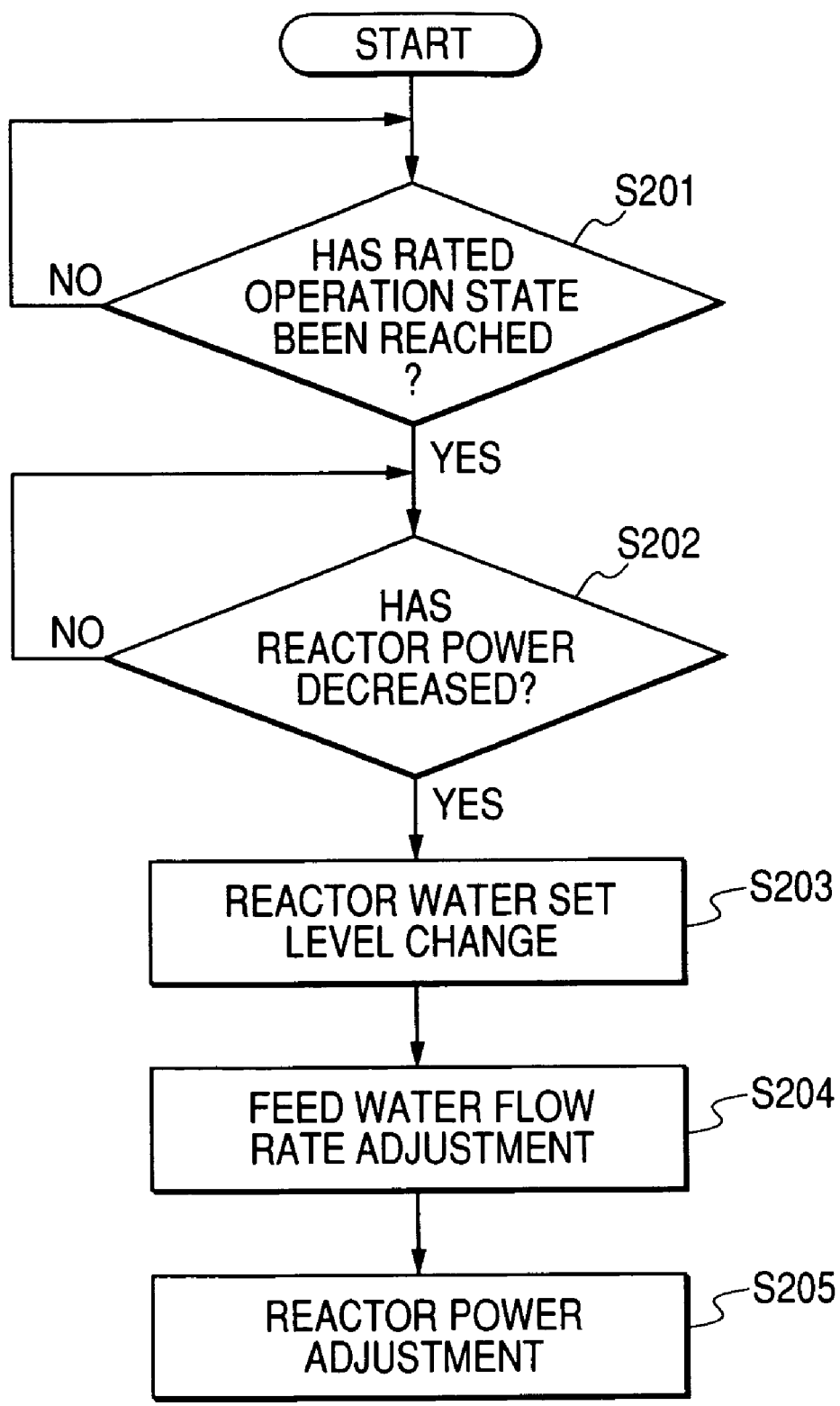
FIG. 18 is a flowchart showing the control process status in the example of FIG. 17.

FIG. 18 shows a flowchart the method for controlling the feed flow rate shown in FIG. 17. The flowchart in FIG. 18 will be described in the following. First a determination is made as to whether the reactor power has exceeded a set level and reached a rated operation state in which the reactor power within a set range is maintained (Step S201). After the rated operation state has been determined, a determination is made as to whether reactor power has decreased (Step S202). In the case where it is determined that the reactor power has been decreased, the reactor set water level is changed (increased) by an amount corresponding to the decrease (Step S203). The feed water flow rate shown in FIG. 17(c) which corresponds to the reactor power decrease is adjusted (Step S204). Consequently, the reactor power is adjusted so as to return to its original state (Step S205). It is to be noted that in the example of FIG. 17 and FIG. 18, in the control example where the reactor power is temporarily reduced, but the feed water control for decreasing the reactor power may be performed by replacing "decrease" with "increase" in the control process shown in FIG. 18.

Figure 19:
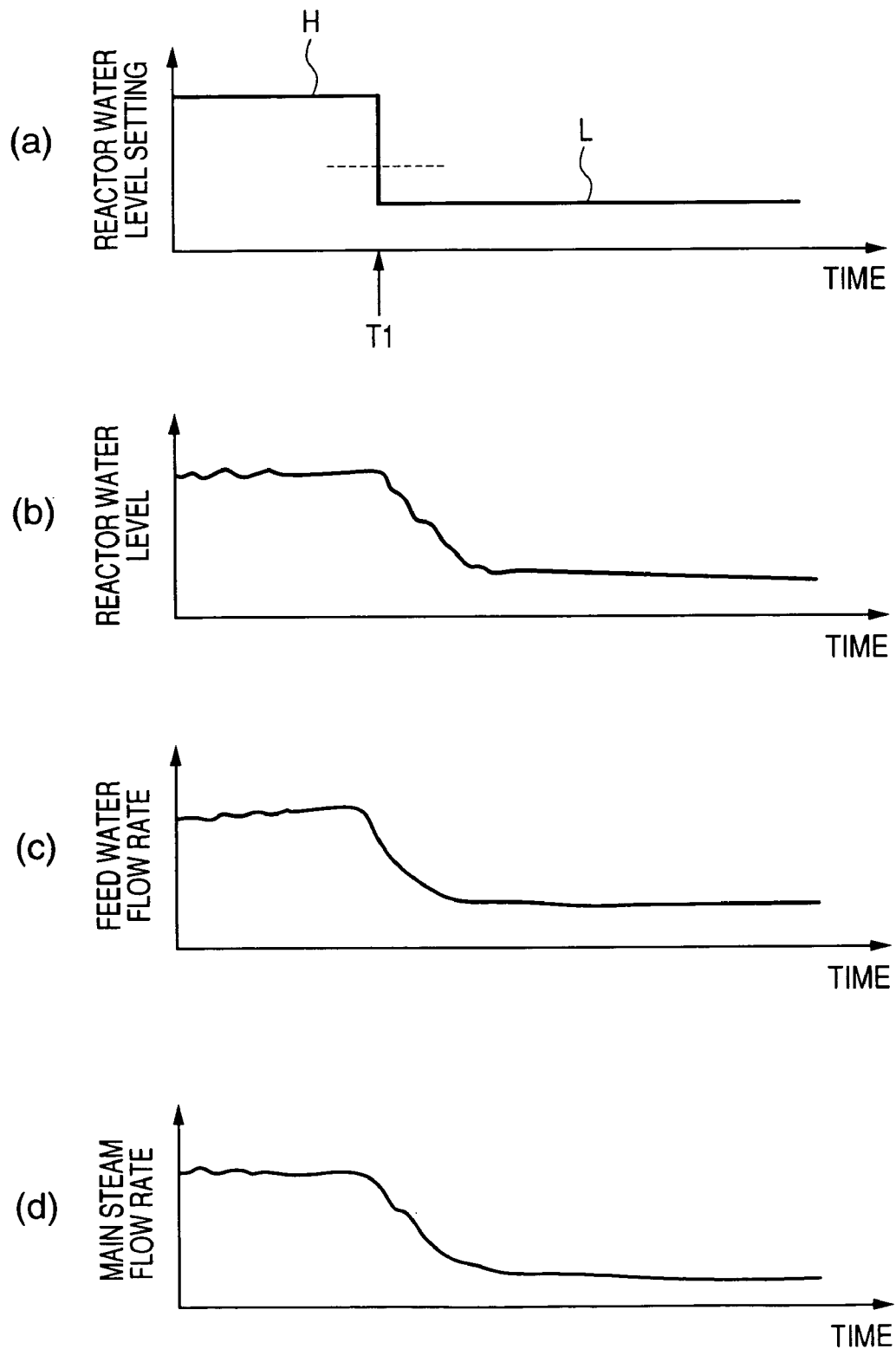
FIG. 19 is a timing chart showing an example of reactor water level control in this embodiment.

An example of the switching processes of the two reactor water level detectors 77 and 32 mounted in the reactor pressure vessel 51 will be described with reference to FIG. 19. The first reactor water level detection signal S2 from the reactor water level detector 77 is used in the period of the normal state. The second reactor water level detection signal S8 from the reactor water level detector 32 is used in ATWS (Anticipated Trangent Without Scram: Scram Failure). As shown in FIG. 19(a), in the normal state, the set reactor water level range is H, and in ATWS, the set reactor water level range is L. When the set reactor water level range is H, the water level detector 77 having the high detection range is used. When the set reactor water level range is L, the water level detector 32 having the low detection range is used. The switching of the first reactor water level detection signal S2 and the second reactor water level detection signal S8 is done by the switch 45 (FIG. 13).

As shown in FIG. 19(a), the ATWS state is reached at timing T1. When the reactor water set level is reduced to the set reactor water level range L, the reactor water level reduction is comparatively large as shown in FIG. 19(b). As shown in FIG. 19(c), the feed water rate is also reduced. Finally, the main steam flow rate which is corresponds to the reactor power (FIG. 19(d)) is reduced and the natural circulation BWR 100 can be maintained in a stable state.

Figure 20:
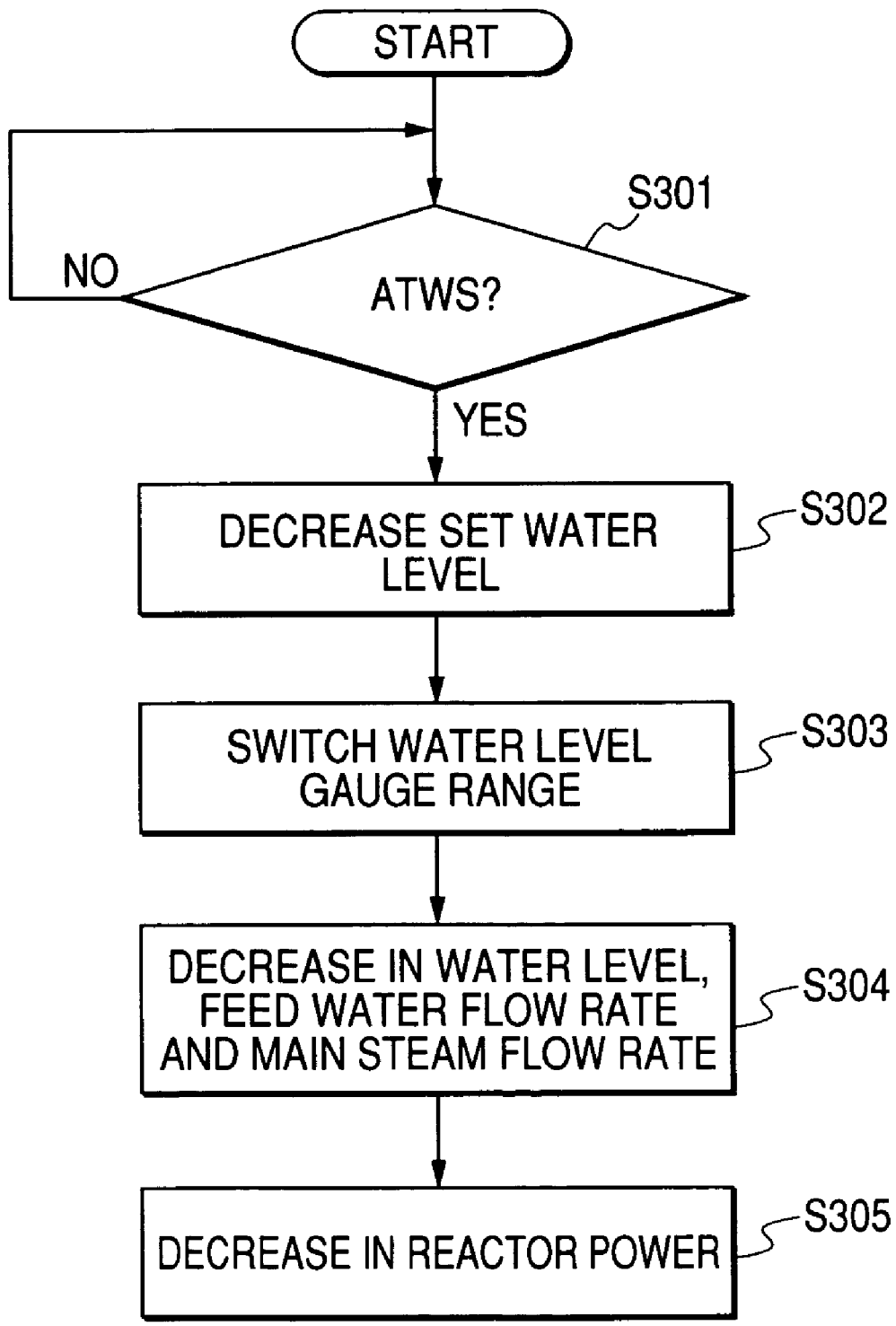
FIG. 20 is a flowchart showing the control process status in the example of FIG. 19.

FIG. 20 shows a flowchart the method for switching the reactor water level detection signals shown in FIG. 17. The flowchart of FIG. 20 will be described in the following. First a determination is made as to whether the ATWS state is achieved (Step S301). When the ATWS state is determined, the reactor water set level is decreased (Step S302). The reactor water level detection signal is switched from the first reactor water level detection signal S2 for normal use to the second reactor water level detection signal S8 for ATWS use (Step S303). In this manner, control is performed such that there is a comparatively large reduction in the reactor water set level. As shown in FIG. 19, the reactor water level, the feed water flow rate and the main steam flow rate are reduced (Step S303). Consequently, the reactor power is reduced (Step S305).

As described above, according to this embodiment, control of reactor power based on reactor water level control becomes possible. Control of reactor power increase or decrease in a state of stable operation, as well as restricted control of reactor power variation during a state of stable operation becomes possible.

Figure 21:
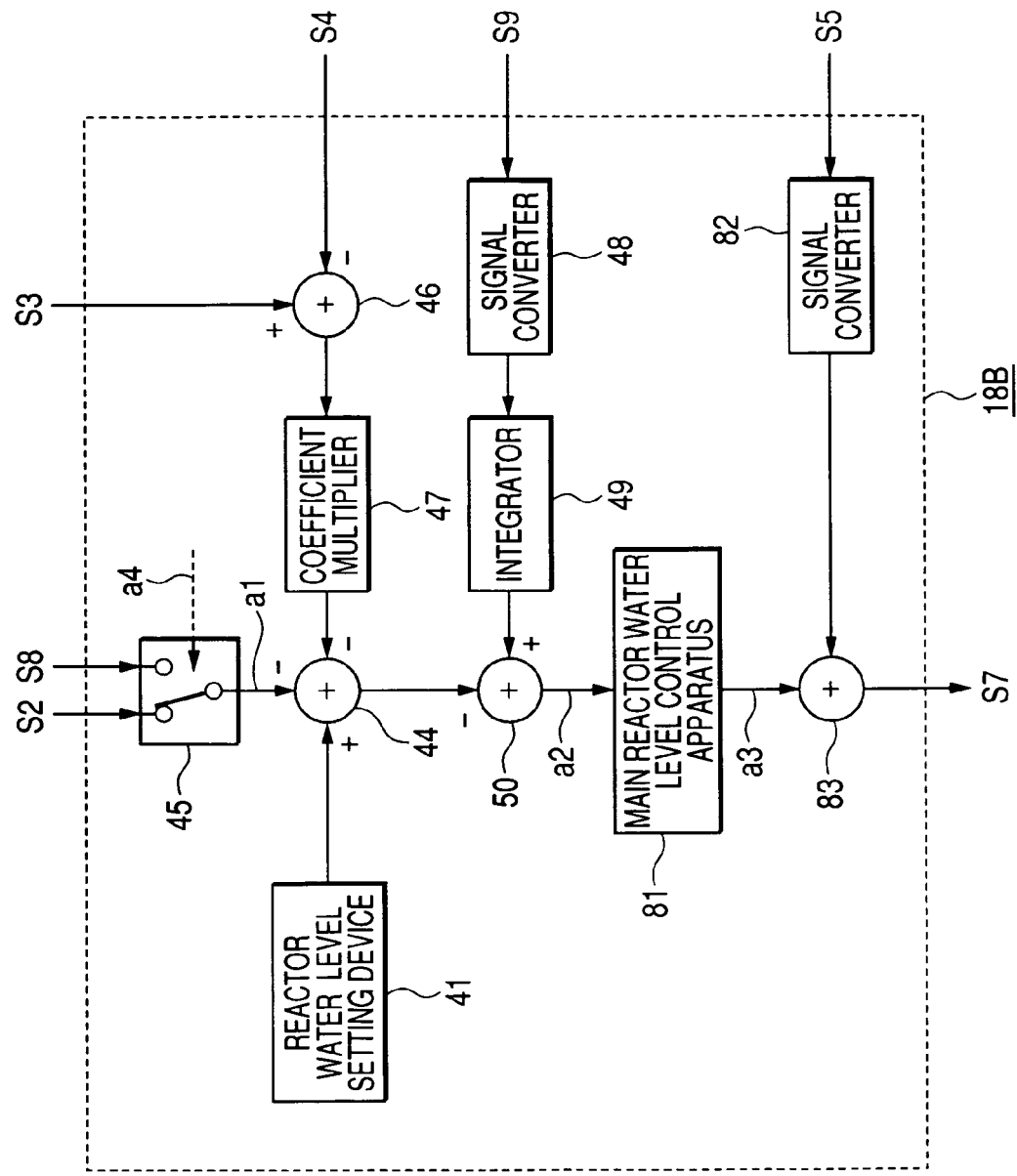
FIG. 21 is structural diagram showing a feed water control apparatus of another embodiment of the present invention.

It is to be noted that the feed water control apparatus 18 shown in FIG. 13 adds the reactor power demand signal S5 to the output from the reactor water level setting device 41, but the reactor power demand signal S5 may also be added to the output of the main water level control apparatus 51. That is to say, as shown in FIG. 21 for example, in the water level control apparatus 18B, the output from the reactor water level setting device 41 is input as it is to the subtractor 44 such that the difference between the other signals is taken. The reactor power demand signal S5 input into the water level control apparatus 18B is subjected to signal characteristic conversion at the signal converter 82, and then input to the calculator 83. The calculator 83 adds the reactor power signal a3 from the main water level control apparatus 81 and the output from the signal converter 82. The added signals output from the calculator 83 are used as the pump rotation speed command S7. Other portions have the same structure as the feed water control apparatus 18A shown in FIG. 13.

Figure 22:
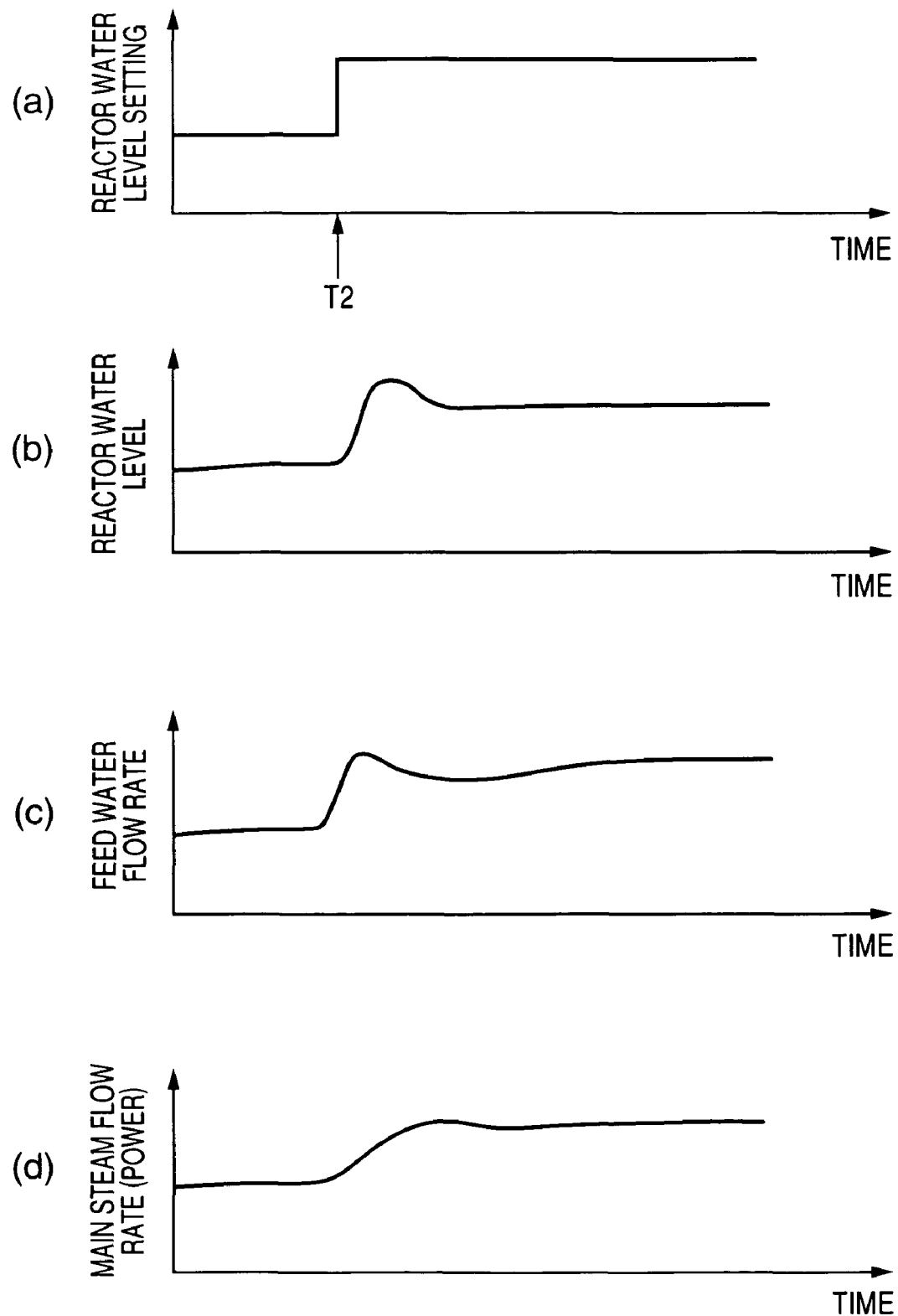
FIG. 22 is a timing chart showing an example of reactor water level control of another embodiment of present invention.

FIG. 22 shows an example of control with the control structure shown in FIG. 21. This example, as shown in FIG. 22(a), is the case where the reactor water level set value is increased at a timing T2. When the reactor water level set value is increased at a timing T2 in this manner, as shown in FIG. 22(b), the reactor water level increases, and as shown in FIG. 22(c), the water level flow rate also increases, and consequently, as shown in FIG. 22(d), the main steam flow rate which is the reactor power, increases. Conversely, by lowering the reactor water level set value, control for lowering the reactor power becomes possible. In this example of FIG. 21 and 22 also, the same control as that of the above-described embodiment is also possible.

It is to be noted that the control apparatus composition shown in FIGS. 13, 14 and 21 have the hardware composition in which input signal addition and the like are performed, but the same signal may be entered into a data processing calculation devices such as a computer device and the like, and by using software processes such as calculation processes or table reference inside the device, control can be performed such that the same data is output.

What is claimed is:

1. A natural circulation boiling water reactor, comprising:
   a reactor pressure vessel having a core and a chimney provided above the core, the core and the chimney being disposed in the reactor pressure vessel;
   at least one movable control rod being arranged for movement with respect to the core;
   a feed water pipe connected to the reactor pressure vessel which supplies feed water to the reactor pressure vessel for natural circulation flow therethrough;
   a power control apparatus which outputs (a) a control rod operation signal until the rector power reaches a first set reactor power obtained by withdrawal of the at least one control rod from the core, and (b) a reactor water level set signal until the reactor power increases from the first set reactor power to a second set reactor power;

a control rod driver which increases reactor power of the reactor by withdrawing the at least one control rod from the core until the reactor power reaches the first set reactor power, based on the control rod operation signal outputted from the power control apparatus; and a feed water controller which increases the reactor power of the reactor by increasing a feed water flow rate through the feed water pipe to the reactor pressure vessel based on the reactor water level set signal outputted from the power control apparatus.

2. The natural circulation boiling water reactor according to claim 1, wherein the feed water controller is arranged so as to adjust the reactor water level to a set reactor water level, and wherein the control rod driver is arranged so as to increase the reactor power in accordance with the withdrawal of the at least one control rod performed while the feed water controller maintains the reactor water level at the set reactor water level, wherein the natural circulation boiling water reactor is configured to enable natural circulation flow of water through the reactor pressure vessel without a forced recirculation flow apparatus.

3. The natural circulation boiling water reactor according to claim 1, wherein the power control apparatus outputs the rector water level set signal until the reactor power increases from the first set reactor power to the second set reactor power which is a rated reactor power.

4. The natural circulation boiling water reactor according to claim 2, wherein the power control apparatus which outputs the reactor water level set signal until the reactor power increases from the first set reactor power to the set reactor water level which is selected to be within a reactor water level setting range.

5. The natural circulation boiling water reactor according to claim 1, further comprising:

a switch determining device which outputs at least one of a control signal to the control rod driver and a control signal to the feed water controller based upon at least the reactor power and the reactor water level so as to enable operation of the control rod driver and the feed water controller in accordance therewith.

* * * * *